(12) United States Patent
Maeda

(10) Patent No.: US 12,065,142 B2
(45) Date of Patent: Aug. 20, 2024

(54) VEHICLE TRAVELING CONTROL APPARATUS

(71) Applicant: SUBARU CORPORATION, Tokyo (JP)

(72) Inventor: Takaya Maeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 330 days.

(21) Appl. No.: 17/691,633

(22) Filed: Mar. 10, 2022

(65) Prior Publication Data

US 2022/0306095 A1    Sep. 29, 2022

(30) Foreign Application Priority Data

Mar. 25, 2021 (JP) ................. 2021-052037

(51) Int. Cl.
*B60W 30/095* (2012.01)
*B60W 60/00* (2020.01)

(52) U.S. Cl.
CPC .. *B60W 30/0956* (2013.01); *B60W 60/00276* (2020.02); *B60W 2554/20* (2020.02);
(Continued)

(58) Field of Classification Search
CPC ........... B60Q 9/002; B60Q 9/008; B60T 1/10; B60T 7/12; B60T 7/18; B60T 7/22; B60T 8/17558; B60T 2201/022; B60T 2210/30; B60T 2210/32; B60T 2210/34; B60W 10/18; B60W 30/09; B60W 30/0956; B60W 30/146; B60W 30/18127; B60W 40/04;
(Continued)

(56) References Cited

U.S. PATENT DOCUMENTS

2018/0357782 A1    12/2018  Nomura
2019/0096249 A1*    3/2019  Swan ................. B60T 7/12
(Continued)

FOREIGN PATENT DOCUMENTS

JP    2018-206305 A    12/2018
JP    2019-16053 A    1/2019

*Primary Examiner* — Peter D Nolan
*Assistant Examiner* — Ce Li Li
(74) *Attorney, Agent, or Firm* — TROUTMAN PEPPER HAMILTON SANDERS LLP

(57) ABSTRACT

A vehicle traveling control apparatus includes a first recognition unit recognizing a surrounding environment based on first surrounding environment information, a transceiver, a second recognition unit recognizing the surrounding environment based on second surrounding environment information, and a traveling control unit stopping a first vehicle when there is a possibility of contact between a first vehicle and a mobile object. While the first vehicle is traveling at low speed, the transceiver sends the first surrounding environment information and receives the second surrounding environment information to/from a second vehicle, and the second recognition unit recognizes that a mobile object is present in a blind spot or that the second vehicle is in a transition state based on the second surrounding environment information. The traveling control unit executes deceleration control and lowers an operation starting threshold when there is the possibility of contact between the first vehicle and the mobile object or the second vehicle.

4 Claims, 8 Drawing Sheets

(52) U.S. Cl.
CPC ............... *B60W 2554/4041* (2020.02); *B60W 2554/4045* (2020.02); *B60W 2556/45* (2020.02)

(58) Field of Classification Search
CPC ......... B60W 60/0011; B60W 60/0017; B60W 60/0027; B60W 60/00276; B60W 2420/403; B60W 2554/00; B60W 2554/20; B60W 2554/402; B60W 2554/4041; B60W 2554/4045; B60W 2554/4049; B60W 2556/40; B60W 2556/45; B60W 2710/06; B60W 2710/18; G08G 1/096725; H04W 4/38; H04W 4/46; H04W 4/80; H04W 4/90
See application file for complete search history.

(56) References Cited

U.S. PATENT DOCUMENTS

| | | | |
|---|---|---|---|
| 2020/0117192 A1* | 4/2020 | Satoh | B62D 6/00 |
| 2020/0331467 A1* | 10/2020 | Ohmura | B60W 30/09 |
| 2023/0021615 A1* | 1/2023 | Inaba | F16D 61/00 |

* cited by examiner

VEHICLE TRAVELING CONTROL APPARATUS

CROSS-REFERENCE TO RELATED APPLICATION

The present application claims priority from Japanese Patent Application No. 2021-052037 filed on Mar. 25, 2021, the entire contents of which are hereby incorporated by reference.

BACKGROUND

The disclosure relates to a vehicle traveling control apparatus.

Recently, automatic driving control techniques have been developed that automatically drive vehicles, such as automobiles, without requiring drivers' operations. The use of these automatic driving control techniques will reduce driving loads on the drivers and improve the traveling stability of vehicles. To this end, various vehicle traveling control apparatuses that assist drivers' driving operations have been proposed and put into practical use.

For example, a typical traveling control apparatus includes a surrounding environment recognition device that includes autonomous sensors such as a camera, a radar device, and a sonar device. When an obstacle, such as a mobile object including another vehicle, a pedestrian, a bicycle, or a two-wheel vehicle, that hinders the vehicle from traveling is detected in a traveling direction of the vehicle (e.g., in a region in front of or behind the vehicle), the traveling control apparatus gives the driver a warning about a possibility of contact, for example. If the driver takes no action to avoid the possible contact in response to the warning, the traveling control apparatus decelerates the vehicle by automatically executing predetermined braking control or stops the vehicle by performing autonomous emergency braking (AEB) control before the vehicle comes into contact with the obstacle.

Various traveling control apparatuses have been proposed that execute traveling control, including emergency braking control, to avoid contact between the own vehicle and an obstacle recognized in the traveling direction of the own vehicle (e.g., in front of the own vehicle) or reduce damage upon contact. For example, references are made to Japanese Unexamined Patent Application Publication (JP-A) Nos. 2018-206305 and 2019-16053. These traveling control apparatuses have been put into practical use.

A typical traveling control apparatus is configured to recognize a mobile object (e.g., another vehicle or a pedestrian) present around the own vehicle (e.g., in front of or behind the own vehicle) on the basis of output data received from various surrounding environment recognition devices. Examples of the surrounding environment recognition devices include sensing devices, such as a camera unit that performs imaging of a predetermined recognition area in the traveling direction of the own vehicle, a millimeter-wave radar that recognizes a predetermined region around the own vehicle (e.g., a left-side or right-side region in front of the own vehicle, and a left-side or right-side region behind the own vehicle), and a sonar that recognizes mainly a predetermined region behind the own vehicle.

Some typical traveling control apparatuses are configured to execute the AEB control to avoid contact between the own vehicle and the recognized mobile object on the basis of the result of recognition performed by the sensing device (i.e., the surrounding environment recognition device) described above.

For these typical traveling control apparatuses, execution of the emergency braking control is triggered when the sensing device (i.e., the surrounding environment recognition device) recognizes, on the traveling road of the own vehicle and in the traveling direction of the own vehicle, a pedestrian, a bicycle, or another mobile object (hereinafter collectively referred to as a "pedestrian") or another vehicle entering the recognition area of the sensing device from outside the recognition area.

SUMMARY

An aspect of the technology provides a vehicle traveling control apparatus including a first recognition unit, a transceiver, a second recognition unit, and a traveling control unit. The first recognition unit is configured to recognize, on the basis of first surrounding environment information acquired by an autonomous sensor device, a surrounding environment around a first vehicle to which the vehicle traveling control apparatus is to be applied. The surrounding environment around the first vehicle includes a mobile object present around the first vehicle. The transceiver is configured to perform wireless communication with an external system outside the first vehicle to send the first surrounding environment information to the external system and receive second surrounding environment information from the external system. The second recognition unit is configured to recognize the surrounding environment around the first vehicle on the basis of the second surrounding environment information. The traveling control unit is configured to control traveling of the first vehicle and includes an emergency braking control unit configured to perform emergency braking control to stop the first vehicle in a case where there is a possibility of contact between the first vehicle and the mobile object recognized by the first recognition unit. While the first vehicle is traveling at low speed, the transceiver is configured to send the first surrounding environment information regarding the first vehicle to a second vehicle parked in front of the first vehicle in a traveling direction of the first vehicle and receive the second surrounding environment information from the second vehicle, the second recognition unit is configured to recognize, on the basis of the second surrounding environment information, that the mobile object is present in a blind spot of the first vehicle in front of the first vehicle in the traveling direction of the first vehicle, or that the second vehicle which is parked is in a transition state from a stopping state to a traveling ready state, and the traveling control unit is configured to execute deceleration control and change an operation starting threshold to a threshold lower than an ordinary value in a case where there is the possibility of contact between the first vehicle and the mobile object or the second vehicle. The operation starting threshold is a control parameter of the emergency braking control.

An aspect of the technology provides a vehicle traveling control apparatus including circuitry. The circuitry is configured to acquire first surrounding environment information, and recognize, on the basis of the first surrounding environment information, a surrounding environment around a first vehicle to which the vehicle traveling control apparatus is to be applied. The surrounding environment around the first vehicle includes a mobile object present around the first vehicle. The circuitry is configured to perform wireless communication with an external system outside the first vehicle to send the first surrounding environment information to the external system and receive second surrounding environment information from the external system; recognize the surrounding environment around the first vehicle on the basis of the second surrounding environment information. The circuitry is configured to perform, while controlling traveling of the first vehicle, emergency braking control to stop the first vehicle in a case where there is a possibility of contact between the first vehicle and the mobile object recognized. While the first vehicle is traveling at low speed, the circuitry is configured to: send the first surrounding environment information regarding the first vehicle to a second vehicle parked in front of the first vehicle in a traveling direction of the first vehicle; receive the second surrounding environment information from the second vehicle; recognize, on the basis of the second surrounding environment information, that the mobile object is present in a blind spot of the first vehicle in front of the first vehicle in the traveling direction of the first vehicle, or that the second vehicle which is parked is in a transition state from a stopping state to a traveling ready state of the second vehicle, and execute deceleration control and change an operation starting threshold to a threshold lower than an ordinary value in a case where there is the possibility of contact between the first vehicle and the mobile object or the second vehicle. The operation starting threshold is a control parameter of the emergency braking control.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
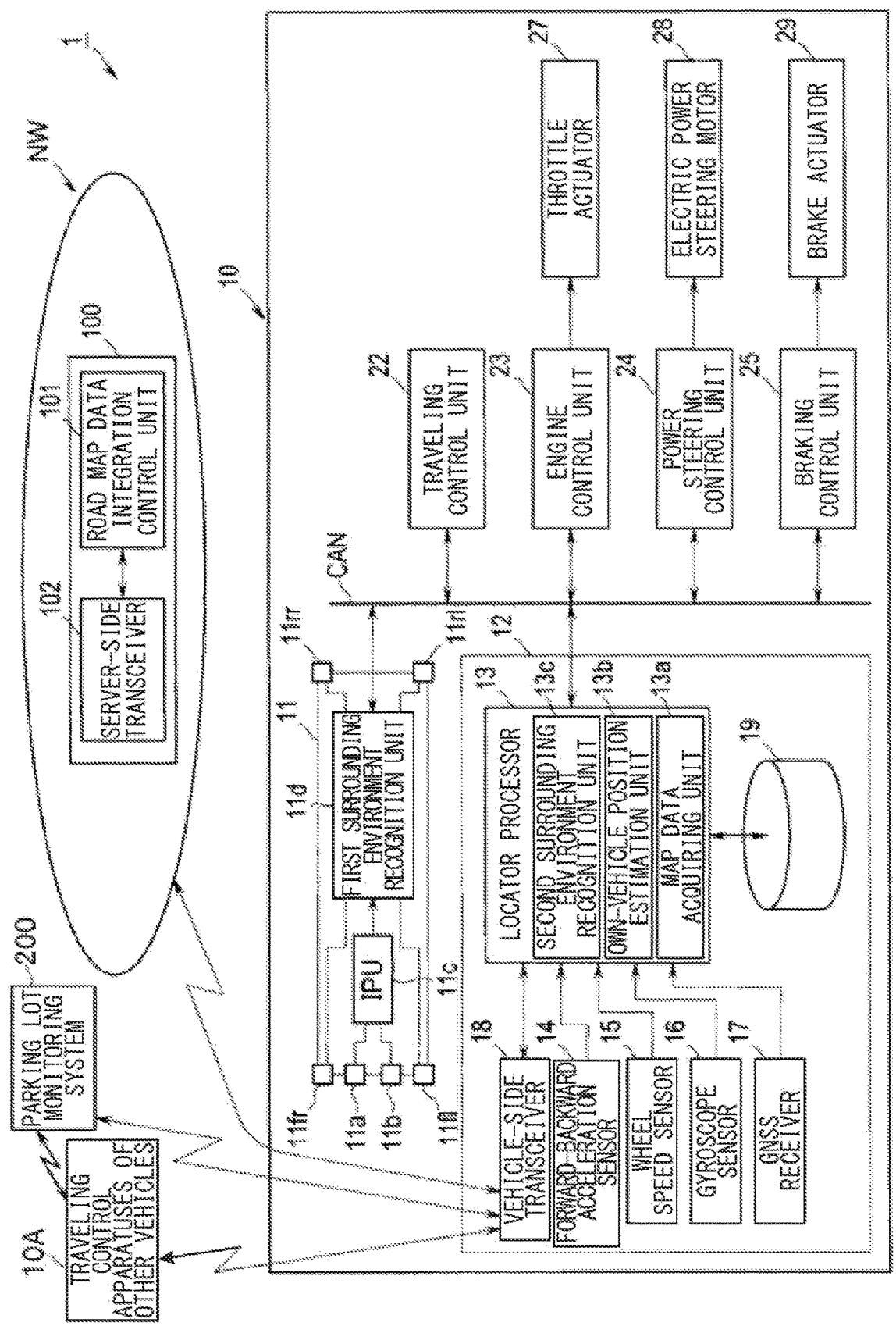
FIG. 1 is a block diagram illustrating an exemplary overall configuration of a traveling control system including a traveling control apparatus according to an example embodiment of the technology.

The typical traveling control apparatuses disclosed in JP-A No. 2018-206305 or 2019-16053 can sometimes fail to surely detect a pedestrian suddenly appearing immediately in front of an own vehicle from outside the recognition area of the camera unit or another surrounding environment recognition device (e.g., from a position just beside the own vehicle). In such a case, the traveling control apparatus can be hindered from executing the emergency braking control. Even if the traveling control apparatus successfully recognizes a mobile object, the emergency braking control triggered when the mobile object is recognized can be too late to avoid contact between the own vehicle and the mobile object. Likewise, in a case where another vehicle having been parked suddenly starts traveling and enters a region immediately in front of the own vehicle traveling on the traveling road, for example, the emergency braking control triggered when the surrounding environment recognition device recognizes the other vehicle (i.e., mobile object) can be too late to appropriately avoid contact with the other vehicle.

In general, a parking lot in a large suburban commercial facility or a rest area of an automobile highway (hereinafter simply referred to as a parking lot) has a relatively large space beside an ordinary road, and the large space accommodates a large number of vehicles. In such a parking lot, traveling roads are provided for vehicles so that a large number of vehicles are allowed to freely move in the large space, enter the large space, and exit from the large space. Additionally, pedestrians are often seen to move disorderly on the traveling roads or between vehicles parked in the parking lots.

In this condition, the vehicle is generally caused to travel at low speed (e.g., 20 km/h or lower). However, while traveling at low speed on the traveling road of the parking lot in such a condition, the vehicle often encounters a pedestrian suddenly appearing immediately in front of the vehicle from a blind spot of the vehicle, such as a spot between parked vehicles, or another vehicle suddenly appearing immediately in front of the vehicle from its parking section.

Unfortunately, in such a case, it is difficult for a typical traveling control apparatus, which is configured to execute the emergency braking control or the like on the basis of the result of recognition of the mobile object by the surrounding environment recognition device, to sufficiently deal with the mobile object (e.g., a pedestrian or another vehicle).

Further, existing high-definition road map data (i.e., dynamic map) currently available generally lack detailed information on the interiors of these parking lots beside ordinary roads. Thus, it has been difficult for a typical traveling control apparatus to recognize the surrounding environment of the vehicle on the basis of the existing road map data or the like while the vehicle is traveling within a parking lot, for example.

It is desirable to provide a vehicle traveling control apparatus that readily avoids contact between a vehicle and a pedestrian, another vehicle, or a mobile object even while the vehicle is traveling in an area beside a road, such as a parking lot.

In the following, some example embodiments of the technology are described in detail with reference to the accompanying drawings. Note that the following description is directed to illustrative examples of the technology and not to be construed as limiting to the technology. The drawings are schematic and are not intended to be drawn to scale. For example, the dimensional relationship between members and the scale of members are different among components to illustrate each component in a size recognizable in the drawings. Factors including, without limitation, the number of components, the shapes of components, the dimensional ratio components, and the positional relationship of components are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. In addition, elements that are not directly related to any embodiment of the technology are unillustrated in the drawings.

A traveling control apparatus according to an example embodiment of the technology may be mounted in a vehicle such as an automobile. The traveling control apparatus assists driving operations of the driver who drives the vehicle. The traveling control apparatus acquires information on the surrounding environment of the vehicle using autonomous sensors, such as a camera unit and radar devices.

The information on the surrounding environment of the vehicle may include information on mobile objects or static objects present around the vehicle. Examples of the mobile objects may include other vehicles traveling in front of the vehicle, other vehicles traveling following the vehicle, other vehicles traveling on an oncoming lane, other vehicles traveling in parallel to the vehicle, pedestrians, and bicycles. Examples of the static objects may include buildings and structures. Hereinafter, the information on the surrounding environment of the vehicle may be referred to as surrounding environment information.

The traveling control apparatus according to the example embodiment may acquire information on road conditions. The information on road conditions may include high-definition road map data (i.e., a dynamic map described in detail below) acquired through communication with an external system (e.g., a high-definition road map database stored in an external server apparatus).

The traveling control apparatus according to the example embodiment may establish direct communication (i.e., inter-vehicle communication) between the vehicle including the traveling control apparatus according to the example embodiment (hereinafter referred to as an own vehicle) and a plurality of vehicles present around the own vehicle and including respective traveling control apparatuses the same as the traveling control apparatus of the own vehicle (hereinafter referred to as other vehicles) to acquire information owned by the other vehicles. In one embodiment, the own vehicle may serve as a "first vehicle". In one embodiment, the other vehicles may serve as a "second vehicle". The information owned by the other vehicles may include data on positions, speeds, control processing of the other vehicles and data on the surrounding environments recognized by the other vehicles. Hereinafter, the information owned by the other vehicles may be referred to as other vehicle information.

The traveling control apparatus according to the example embodiment may use the various information acquired as described above, such as the surrounding environment information, the high-definition road map data, and the other vehicle information, to assist driving operations of the driver who drives the own vehicle, as appropriate.

Figure 2:
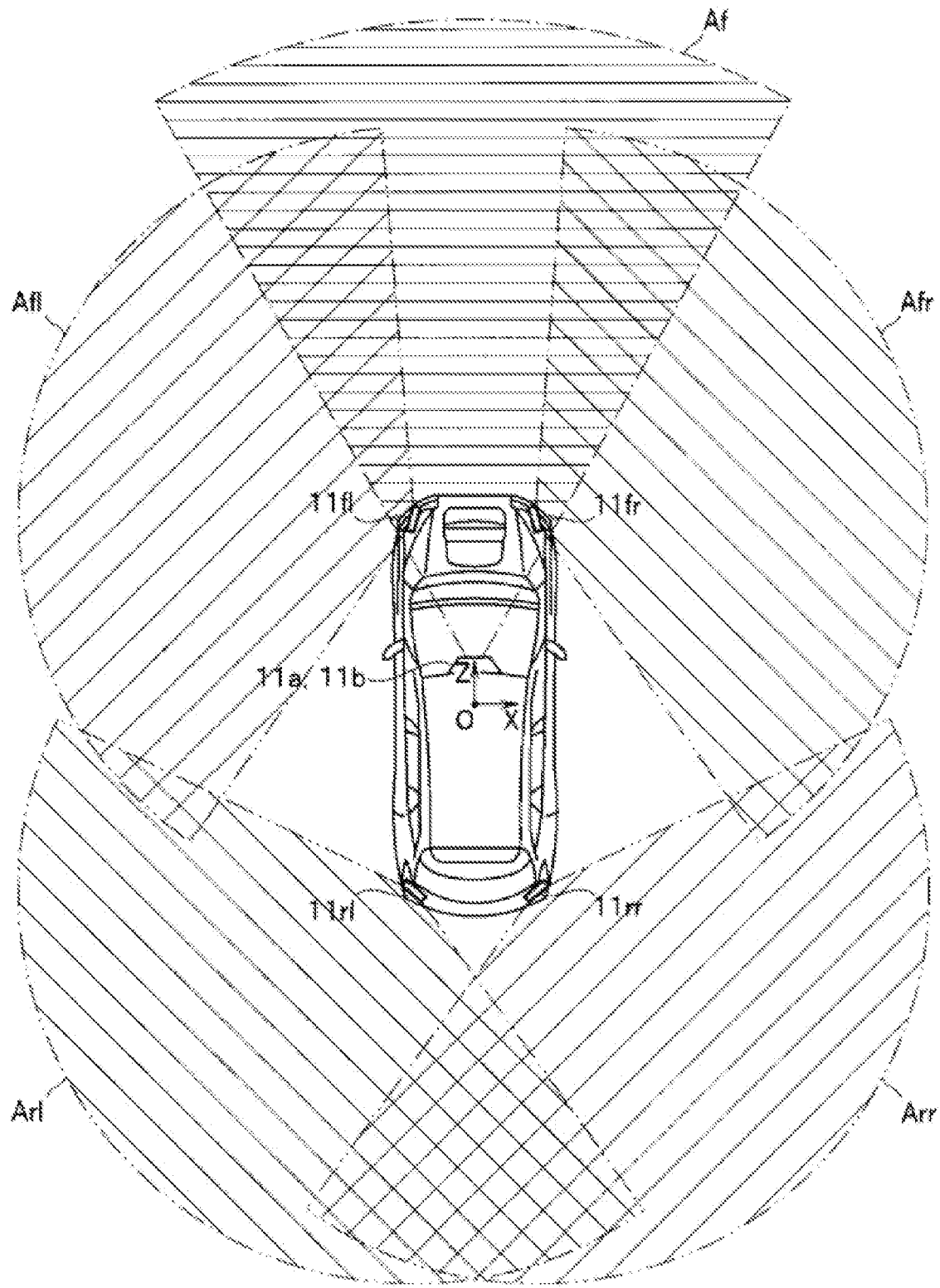
FIG. 2 is a conceptual diagram illustrating exemplary recognition areas of a camera unit and radar devices included in the traveling control apparatus illustrated in FIG. 1.

First, an exemplary schematic configuration of the traveling control apparatus according to the example embodiment of the technology is described with reference to the drawings. FIG. 1 is a block diagram illustrating an exemplary overall configuration of a traveling control system 1 including a traveling control apparatus 10 according to the example embodiment of the technology. FIG. 2 is a conceptual diagram illustrating the recognition area of the camera unit and the radar devices of the traveling control apparatus 10 illustrated in FIG. 1.

Basically, the traveling control system 1 illustrated in FIG. 1 may have substantially the same configuration as a typical traveling control system of the same type. Thus, only main components of the traveling control apparatus 10 according to the example embodiment are illustrated in FIG. 1, and illustrations of the other minor components not directly relevant to the technology are omitted in FIG. 1. Additionally, the following description focuses on the main components relevant to the technology, and detailed descriptions of the other minor components not directly relevant to the technology are omitted as they are supposed to be the same as those of the traveling control apparatus included in the typical traveling control system.

As illustrated in FIG. 1, the traveling control system 1 may include the traveling control apparatuses 10 according to the example embodiment mounted on respective vehicles and control apparatuses 100. The control apparatuses 100 may be provided in a network environment NW to which the traveling control apparatuses 10 are connected via wireless communication.

The control apparatus 100 may be a server device provided in a cloud computing network environment, an edge computing network environment, or a road ancillary equipment network environment.

The control apparatus 100 may sequentially integrate and update road map data received from the traveling control apparatuses 10 mounted in the respective vehicles and send the updated road map data to the respective vehicles. To this end, the control apparatus 100 may include a road map data integration control unit 101 and a server-side transceiver 102.

The road map data integration control unit 101 may integrate the road map data collected from the respective vehicles via the server-side transceiver 102 to sequentially update the road map data regarding the environments surrounding the vehicles on the road. For example, the road map data may include high-definition road map data (i.e., a dynamic map) having four information layers: static information, quasi-static information, quasi-dynamic information, and dynamic information. The static information and the quasi-static information may mainly include road information, and the quasi-dynamic information and the dynamic information may mainly include traffic information.

The static information may be three-dimensional road map data including data on road surfaces, lane lines, positions of structures on roads or road edges, and permanent traffic regulations, for example. The static information may need to be updated every month or more frequently.

The quasi-static information may include data on temporary regulations such as schedules of traffic regulations due to road constructions or other events, data on wide-range weather, and data on traffic congestion estimation, for example. The quasi-static information may need to be updated every hour or more frequently.

The quasi-dynamic information may include data on actual traffic congestion or traveling regulations at a measurement time, data on temporary traveling troubles due to fallen objects or obstacles, data on accidents actually happened, and data on narrow-range weather, for example. The quasi-dynamic information may need to be updated every minute or more frequently.

The dynamic information may be real-time information including data exchanged among the mobile objects (e.g., vehicles), data on a signal currently indicated, data on pedestrians and two-wheel vehicles present at an intersection, and data on vehicles traveling straight through the intersection, for example. The dynamic information may need to be updated every second or more frequently.

These pieces of the road map data may be maintained until the next road map data is received from each vehicle, and updated every time new data is received. The updated road map data may be transmitted to each vehicle via the server-side transceiver 102, as appropriate.

The traveling control apparatus 10 may include a surrounding environment recognition unit 11 that recognizes the surrounding environment outside the vehicle and a locator unit 12. The traveling control apparatus 10 may further include a traveling control unit 22, an engine control unit 23, a power steering control unit 24, and a braking control unit 25. These control units 22 to 25 may be coupled to the surrounding environment recognition unit 11 and the locator unit 12 via an in-vehicle communication line such as a controller area network (CAN). In one embodiment, the traveling control unit 22 may serve as a "traveling control unit".

The surrounding environment recognition unit 11 may include a camera unit (e.g., a stereo camera unit), an image processing unit (IPU) 11c, and a first surrounding environment recognition unit 11d. The camera unit may include a main camera 11a and a subsidiary camera 11b. The camera unit may be fixed at an upper central position of the front interior vehicle compartment, for example. The IPU 11c may be coupled to the camera unit and the first surrounding environment recognition unit 11d. In one embodiment, the first surrounding environment recognition unit 11d may serve as a "first recognition unit".

The main camera 11a and the subsidiary camera 11b (i.e., the camera unit) may be autonomous sensors that sense the real space in front of the own vehicle. The main camera 11a and the subsidiary camera 11b may be disposed symmetrically about the middle of the vehicle width direction, and capture stereo images of a predetermined region (see a region Af in FIG. 2) in front of the own vehicle from different directions.

The IPU 11c may perform image processing on the image data on the predetermined region in front of the own vehicle captured by the main camera 11a and the subsidiary camera 11b, to generate image data on the front surrounding environment (hereinafter referred to as distance image data). The distance image data may be calculated on the basis of the amount of positional shift of an object of interest in the images.

The first surrounding environment recognition unit 11d may recognize lane dividing lines that divide the road around the vehicle on the basis of the distance image data received from the IPU 11c, for example. The first surrounding environment recognition unit 11d may further calculate the road curvatures [1/m] of the left and right lane dividing lines that respectively define the left and right sides of the road on which the own vehicle is traveling (hereinafter referred to as an own-vehicle traveling lane), and the width between the left and right lane dividing lines (i.e., the lane width). The road curvatures and the lane width may be calculated by various known methods. For example, the first surrounding environment recognition unit 11d may recognize the left and right lane dividing lines on the basis of the image data on the front surrounding environment through a binarization process using luminance differences and calculate the curvatures of the left and right lane dividing lines for each predetermined section through a least-square method using a curve approximate expression.

The first surrounding environment recognition unit 11d may further perform predetermined pattern matching on the distance image data to recognize three-dimensional objects, such as guardrails and curb stones that extend along the road, pedestrians, two-wheel vehicles, and vehicles other than the two-wheel vehicles, that are present on the road around the vehicle. To recognize a three-dimensional object, the first surrounding environment recognition unit 11d may detect the type of the three-dimensional object, the distance to the three-dimensional object, the speed of the three-dimensional object, and the relative speed between the three-dimensional object and the vehicle, for example. Hereinafter, the three-dimensional object recognized on the basis of the image captured by the camera unit (e.g., the main camera 11a and the subsidiary camera 11b) may be referred to as a camera object.

To the first surrounding environment recognition unit 11d, a plurality of autonomous sensors such as radar devices may be coupled. The radar devices may include, for example, a left-front radar device 11fl, a right-front radar device 11fr, a left-rear radar device 11rl, and a right-rear radar device 11rr.

The left-front radar device 11fl and the right-front radar device 11fr may be respectively disposed on the left and right sides of the front bumper, for example. The left-front radar device 11fl and the right-front radar device 11fr may monitor respective regions that the main camera 11a and the subsidiary camera 11b are not able to monitor. As illustrated in FIG. 2, the left-front radar device 11fl may monitor a region Afl lying diagonally forward left of the own vehicle, and the right-front radar device 11fr may monitor a region Afr lying diagonally forward right of the own vehicle. The left-front radar device 11fl and the right-front radar device 11fr may be disposed such that the regions Afl and Afr are partially superimposed on the predetermined region Af monitored by the main camera 11a and the subsidiary camera 11b.

The left-rear radar device 11rl and the right-rear radar device 11rr may be respectively disposed on the left and right sides of the rear bumper, for example. The left-rear radar device 11rl and the right-rear radar device 11rr may monitor respective regions that the left-front radar device 11fl and the right-front radar device 11fr are not able to monitor. As illustrated in FIG. 2, the left-rear radar device 11rl may monitor a region Arl extending from the left side of the own vehicle to behind the own vehicle, and the right-rear radar device 11rr may monitor a region Arr extending from the right side of the own vehicle to behind the own vehicle. The left-rear radar device 11rl and the right-rear radar device 11rr may be disposed such that the regions Arl and Arr are partially superimposed on each other.

The right-front radar device 11fr and the right-rear radar device 11r may be disposed such that the regions Afr and Arr are partially superimposed on each other. The left-front radar device 11fl and the left-rear radar device 11rl may be disposed such that the regions Afl and Arl are partially superimposed on each other.

The radar devices 11fl, 11fr, 11rl, and 11rr may each include a millimeter-wave radar, a laser radar, a light detection and ranging (LIDER), or the like. The radar devices 11fl, 11fr, 11rl, and 11rr may each emit a radar wave (e.g., a radio wave or a laser beam) in a horizontal direction at every predetermined frame cycle and receive reflective waves of the emitted radar wave. The radar device 11fl, 11fr, 11rl, or 11rr may thereby detect a plurality of reflective points on a three-dimensional object present around the own vehicle. Thereafter, the radar device 11*fl*, 11*fr*, 11*rl*, or 11*rr* may recognize the three-dimensional object by analyzing and grouping the positions of the detected reflective points (i.e., the relative position between the three-dimensional object and the own vehicle) and the moving speed of the three-dimensional object, for example.

Additionally, the radar device 11*fl*, 11*fr*, 11*rl*, or 11*rr* may select a representative point from the reflective points on the recognized three-dimensional object. The representative point may be a reflective point closest to the own vehicle in a straight line. Thereafter, the radar device 11*fl*, 11*fr*, 11*rl*, or 11*rr* may acquire data on the representative point, such as the position and the relative speed of the reflective point corresponding to the representative point, and recognize the dimensions of the three-dimensional object calculated on the basis of the distribution of the reflective points. Hereinafter, the three-dimensional object recognized by the radar device 11*fl*, 11*fr*, 11*rl*, or 11*rr* may be referred to as a radar object.

The information on the radar object recognized by the radar device 11*fl*, 11*fr*, 11*rl*, or 11*rr* may be transmitted to the first surrounding environment recognition unit 11*d*. In this way, the first surrounding environment recognition unit 11*d* may recognize various mobile objects such as a preceding vehicle present in front of the own vehicle, a vehicle traveling in parallel with the own vehicle, a vehicle traveling toward the own vehicle on a road crossing the own-vehicle traveling lane at an intersection, a following vehicle present behind the own vehicle, and a pedestrian or a bicycle present around the own vehicle.

The first surrounding environment recognition unit 11*d* may convert the position of the camera object or the radar object into a Cartesian coordinate system with an origin O at the center of the own vehicle, for example. The Cartesian coordinate system may have a Z-axis extending in a length direction of the own vehicle, and an X-axis extending in a width direction of the own vehicle, as illustrated in FIG. 2, for example. Hereinafter, the information on the camera object and the radar object recognized by the first surrounding environment recognition unit 11*d* may be referred to as first surrounding environment information.

The locator unit 12 may estimate the position of the own vehicle on the road map. The locator unit 12 may include a locator processor 13 that estimates the position of the own vehicle. The locator processor 13 may have an input side to which various sensors necessary to estimate the position of the own vehicle (hereinafter also referred to as an own vehicle position) are coupled. Examples of the various sensors may include a forward-backward acceleration sensor 14, a wheel speed sensor 15, a gyroscope sensor 16, and a GNSS receiver 17. The forward-backward acceleration sensor 14 may detect forward or backward acceleration of the own vehicle. The wheel speed sensor 15 may detect the revolution speeds of the front, rear, left, and right wheels. The gyroscope sensor 16 may detect an angular speed or angular acceleration of the own vehicle. The GNSS receiver 17 may receive positioning signals from a plurality of positioning satellites. To the locator processor 13, a vehicle-side transceiver 18 may be coupled. The vehicle-side transceiver 18 may establish wireless communication between the own vehicle and an external system (e.g., an external server or another vehicle) to send and receive various pieces of information. In one embodiment, the vehicle-side transceiver 18 may serve as a "transceiver".

The vehicle-side transceiver 18 may send and receive information to/from the control apparatus 100 via wireless communication, for example. That is, the vehicle-side transceiver 18 may establish road-to-vehicle communication with the control apparatus 100. Further, the vehicle-side transceiver 18 may send and receive information to/from the other vehicles each including a traveling control apparatus 10A (see FIG. 1) having substantially the same configuration as the traveling control apparatus 10 according to the example embodiment. That is, the vehicle-side transceiver 18 may establish inter-vehicle communication with the other vehicles.

The vehicle-side transceiver 18 of the traveling control apparatus 10 according to the example embodiment may further send and receive information to/from a small-scale administration system (e.g., a so-called mini server system or local server system) via wireless communication. For example, the small-scale administration system may include a small-scale administration apparatus disposed on a peripheral region along a road to administrate limited regions or sites in a large suburban commercial facility beside the road or a parking lot of a rest area of an automobile highway (hereinafter simply referred to as a parking lot).

FIG. 1 illustrates a parking lot monitoring system 200 as an example of the small-scale administration system. Hereinafter, the information used in the parking lot monitoring system 200 and transmitted between the vehicles may be referred to as parking lot environment information.

Although a detailed illustration of the parking lot monitoring system 200 is omitted in the drawings, the parking lot monitoring system 200 may include, for example, a transceiver, at least one monitor camera, and a control unit. The transceiver may send and receive information to/from the traveling control apparatuses 10 and 10A via wireless communication. The monitor camera may acquire image data on the interior of the parking lot. The control unit may comprehensively control the units in the parking lot monitoring system 200. Detailed description of the configuration of the small-scale administration system or the parking lot monitoring system 200 is omitted herein as the configuration conforms to the configuration of a typical control apparatus, for example.

To the locator processor 13, a high-resolution road map database 19 may be coupled. The high-resolution road map database 19 may be a mass storage medium, such as a hard disk drive HDD or a solid state drive (SSD), in which high-resolution road map data (a dynamic map) is stored.

The high-resolution road map data may be needed when the traveling control of the own vehicle is executed. For example, the high-resolution road map data may include data similar to the road map data sequentially updated by the road map data integration control unit 101. That is, the high-resolution road map data may include four information layers: static information and quasi-static information that mainly include road information, and quasi-dynamic information and dynamic information that mainly include traffic information. The high-resolution road map data may be substantially the same as the high-definition road map data stored in the road map data integration control unit 101.

The locator processor 13 may include a map data acquiring unit 13*a*, an own-vehicle position estimation unit 13*b*, and a second surrounding environment recognition unit 13*c*. In one embodiment, the second surrounding environment recognition unit 13*c* may serve as a "second recognition unit".

The map data acquiring unit 13*a* may retrieve route map data from the map data stored in the high-resolution road map database 19 on the basis of a destination set by the driver for automatic driving, for example. The route map data may indicate the route from a current location to the destination. Further, the map data acquiring unit 13a may send the acquired route map data (data on lane lines on the route map) to the own-vehicle position estimation unit 13b.

The own-vehicle position estimation unit 13b may acquire the positional coordinates of the own vehicle on the basis of the positioning signals received at the GNSS receiver 17. Further, the own-vehicle position estimation unit 13b may estimate the own vehicle position on the road map by performing map matching of the acquired positional coordinates on the route map data. Additionally, the own-vehicle position estimation unit 13b may recognize left and right lane dividing lines that define the road on which the own vehicle is traveling (i.e., the own-vehicle traveling lane), and acquire the road curvature of the middle of the own-vehicle traveling lane stored in the road map data.

In an environment (e.g., inside a tunnel) in which the GNSS receiver 17 is not able to receive effective positional signals from the positioning satellites due to a decrease in the sensitivity of the GNSS receiver 17, the own-vehicle position estimation unit 13b may make a switch to autonomous navigation to estimate the own vehicle position on the road map. In the autonomous navigation, the own-vehicle position may be estimated on the basis of the vehicle speed calculated from the wheel speeds detected by the wheel speed sensor 15, the angular speed detected by the gyroscope sensor 16, and the forward or backward acceleration rate detected by the forward-backward acceleration sensor 14.

After estimating the own vehicle position on the road map on the basis of the positioning signals received by the GNSS receiver 17 and the data detected by the gyroscope sensor 16 and the other sensors, the own-vehicle position estimation unit 13b may determine the type of the traveling road on which the own vehicle is traveling on the basis of the estimated own vehicle position on the road map.

The second surrounding environment recognition unit 13c may update the road map data stored in the high-resolution road map database 19 to the latest one using the road map data acquired by communicating with an external system (e.g., road-to-vehicle communication or inter-vehicle communication) via the vehicle-side transceiver 18. The update may be conducted on the static information, the quasi-static information, the quasi-dynamic information, and the dynamic information. The road map data may thus include the road information and the traffic information received through the communication with external devices, enabling a substantially real-time update of the information on mobile objects, such as vehicles traveling on the road.

Further, the second surrounding environment recognition unit 13c may verify the road map data on the basis of the first surrounding environment information on mobile bodies recognized by the first surrounding environment recognition unit 11d of the surrounding environment recognition unit 11, and update the road map data stored in the high-resolution road map database 19 to the latest one. The update may be conducted on the static information, the quasi-static information, the quasi-dynamic information, and the dynamic information. Accordingly, the information on mobile objects, such as vehicles or pedestrians moving on the road, recognized by the surrounding environment recognition unit 11 (i.e., the first surrounding environment information) may be updated in real time. The road map data updated in this way may be transmitted to the control apparatus 100 and the other vehicles present around the own vehicle through the road-to-vehicle communication or the inter-vehicle communication via the vehicle-side transceiver 18.

Further, the second surrounding environment recognition unit 13c may retrieve second surrounding environment information from the updated road map data. The second surrounding environment information may be the road map data within a predetermined region around the own vehicle position estimated by the own-vehicle position estimation unit 13b. The range of the second surrounding environment information retrieved by the second surrounding environment recognition unit 13c may be larger than the range of the first surrounding environment information retrieved by the first surrounding environment recognition unit 11d. For example, the second surrounding environment information may be the road map data on a range within a one-kilometer radius around the own vehicle position.

On the basis of the other vehicle information received from the other vehicles present around the own vehicle via the communication with the external system through the vehicle-side transceiver 18 and the parking lot environment information received from the parking lot monitoring system 200 provided in the area (e.g., a parking lot) in which the own vehicle is present, the second surrounding environment recognition unit 13c of the traveling control apparatus 10 according to the example embodiment may verify the information on the surrounding environment around the own vehicle that the first surrounding environment recognition unit 11d is unable to recognize by itself. The second surrounding environment recognition unit 13c may thereby recognize information on mobile objects, such as pedestrians or bicycles, supposed to be present in a blind spot of the own vehicle in the real time. In this case, the other vehicle information and the parking lot environment information may be also recognized as the second surrounding environment information.

The first surrounding environment information on the mobile objects recognized by the first surrounding environment recognition unit 11d of the surrounding environment recognition unit 11 and the second surrounding environment information recognized by the second surrounding environment recognition unit 13c of the locator unit 12 may be read by the traveling control unit 22.

The traveling control unit 22 may have an input side to which various switches and sensors (not illustrated) are coupled. Examples of the various switches and sensors may include a mode switch, a steering torque sensor, a brake sensor, an accelerator sensor, and a yaw rate sensor. The driver may operate the mode switch to switch on or off the automatic driving. The steering torque sensor may detect the amount of a driving operation performed by the driver such as the steering torque. The brake sensor may detect the amount of a driving operation performed by the driver such as the stepping quantity of the brake pedal. The accelerator sensor may detect the amount of a driving operation performed by the driver such as the stepping quantity of the accelerator pedal. The yaw rate sensor may detect the yaw rate exerted on the own vehicle.

The traveling control unit 22 may comprehensively control traveling of the own vehicle on the basis of the first surrounding environment information, which is the information on the surrounding environment including the mobile objects acquired by the first surrounding environment recognition unit 11d, and the second surrounding environment information, which is various pieces of information acquired by the locator unit 12, for example.

The traveling control unit 22 may perform traveling control on the basis of the driving mode selected by operating the mode switch, for example. The traveling control unit 22 may further perform autonomous emergency braking (AEB) control as appropriate when detecting a possibility of contact between the own vehicle and a moving object, such as a pedestrian, a bicycle, or another vehicle, moving around the own vehicle, or a static obstacle, such as a building present around the vehicle, while the own vehicle is traveling. The AEB control may be performed basically on the basis of the first surrounding environment information recognized by the first surrounding environment recognition unit 11d (i.e., the information on the mobile objects, such as the camera objects or the radar objects, recognized by the main camera 11a and the subsidiary camera 11b, or the radar devices 11fl, 11fr, 11rl, and 11rr), and the second surrounding environment information (e.g., the other vehicle information or the parking lot environment information) recognized by the second surrounding environment recognition unit 13c, for example. In this case, the traveling control unit 22 may serve as an emergency braking control unit.

The engine control unit 23 may have an output side to which a throttle actuator 27 is coupled. The throttle actuator 27 may open and close an electronically controlled throttle valve disposed on a throttle body of the engine. The throttle actuator 27 may open or close the throttle value in response to a drive signal from the engine control unit 23 to regulate the flow rate of the intake air. This generates a desired engine output.

The power steering control unit 24 may have an output side to which an electric power steering motor 28 is coupled. The electric power steering motor 28 may impart steering torque to a steering mechanism using the rotatory power of the motor. During the automatic driving, the electric power steering motor 28 may be operated in response to a drive signal from the power steering control unit 24 to execute active lane keeping control that keeps the own vehicle traveling on the current traveling lane and lane changing control that moves the own vehicle to an adjacent lane (e.g., lane changing control for overtaking).

The braking control unit 25 may have an output side to which a brake actuator 29 is coupled. The brake actuator 29 may regulate the hydraulic pressure to be supplied to a brake wheel cylinder of each wheel. When the brake actuator 29 is driven in response to a drive signal from the braking control unit 25, the brake wheel cylinders may generate brake force on the respective wheels, which forcibly decelerates the own vehicle.

The locator unit 12, the first surrounding environment recognition unit 11d, the traveling control unit 22, the engine control unit 23, the power steering control unit 24, the braking control unit 25, and the like may each include a microcomputer including, for example, a central processing unit (CPU), a random access memory (RAM), a read only memory (ROM), a non-volatile memory, and peripheral devices. The ROM may preliminarily store programs to be executed by the CPU and fixed data such as data tables, for example.

When the traveling control apparatus 10 according to the example embodiment recognizes a mobile object, such as a pedestrian or another vehicle, on the basis of the first surrounding environment information, which is acquired from the camera unit (i.e., the main camera 11a and the subsidiary camera 11b) and the radar devices 11fl, 11fr, 11rl, and 11rr, and the second surrounding environment information, which is acquired from the parking lot monitoring system 200 or the traveling control apparatuses 10A mounted in the other vehicles present within the parking lot, while the own vehicle is traveling in a limited area within the parking lot, the traveling control apparatus 10 may execute predetermined deceleration control or emergency braking control, as described below.

Among the components of the traveling control apparatus 10 according to the example embodiment descried above, some components used for traveling control on an ordinary road, such as the control apparatus 100 and some components of the locator processor 13 in the locator unit 12, are not essential in the condition exemplified in the example embodiment (e.g., the condition in which the own vehicle is traveling in an area such as a parking lot). Thus, these components may be omitted as appropriate.

In this case, the forward-backward acceleration sensor 14, the wheel speed sensor 15, the gyroscope sensor 16, and the other sensors in the locator unit 12 may be coupled to the first surrounding environment recognition unit 11d or the traveling control unit 22, for example. Additionally, the vehicle-side transceiver 18 in the locator unit 12 and the second surrounding environment recognition unit 13c in the locator processor 13 may be coupled to the traveling control unit 22. The exemplary configuration of the traveling control apparatus 10 according to the example embodiment has been schematically described above.

Figure 3:
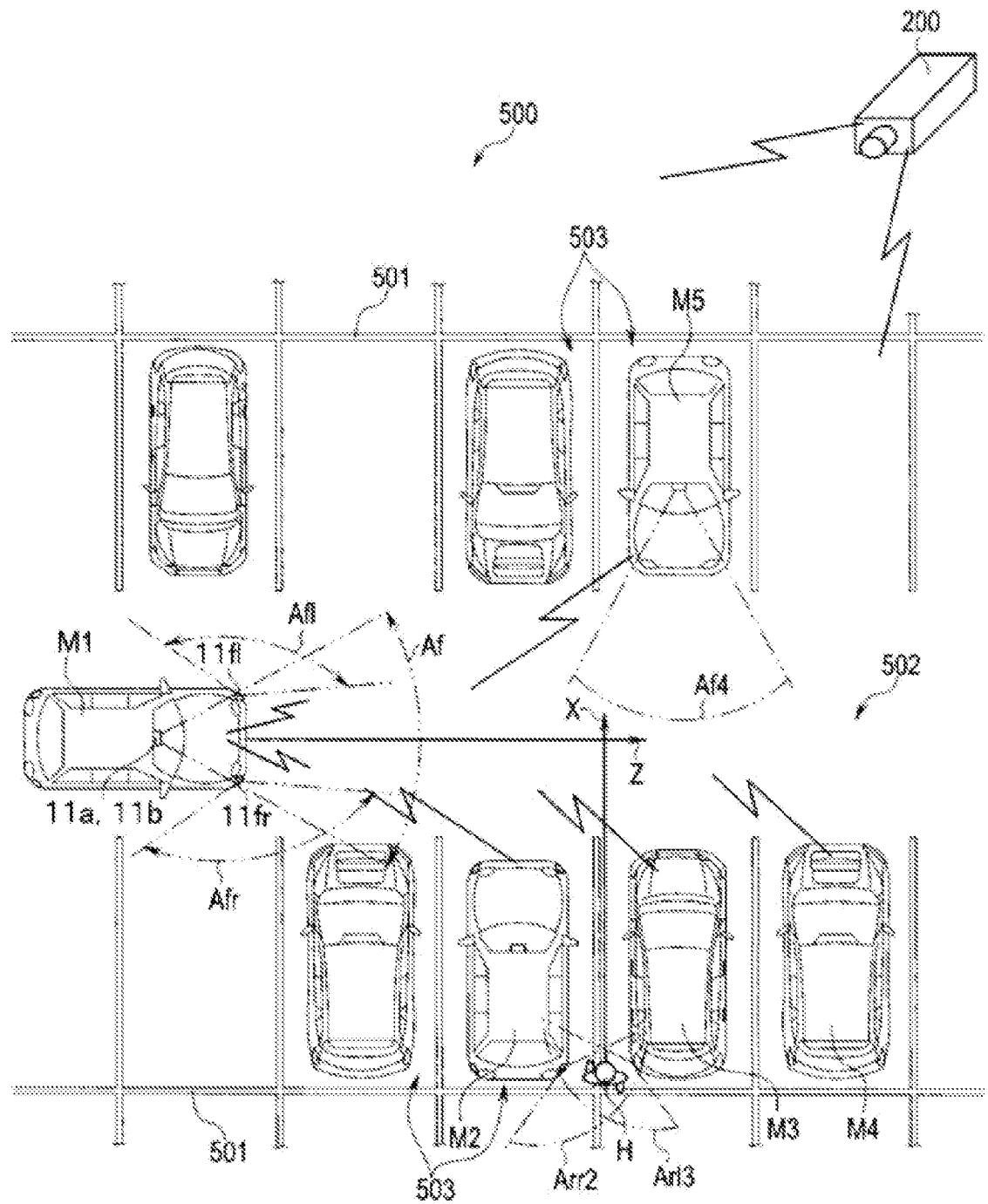
FIG. 3 is a conceptual diagram illustrating a vehicle including the traveling control apparatus according to the example embodiment of the technology and traveling in an area, such as a parking lot.

An exemplary condition in which the vehicle including the traveling control apparatus 10 according to the example embodiment with the configuration described above may encounter when entering a parking lot beside an ordinary road and traveling within the parking lot may be simply described with reference to FIG. 3. FIG. 3 is a conceptual diagram of the exemplary condition in which the vehicle including the traveling control apparatus according to the example embodiment travels within the parking lot, for example.

In the condition illustrated in FIG. 3, an own vehicle M1 including the traveling control apparatus 10 (not illustrated in FIG. 3) may travel on a traveling road 502 within the parking lot 500 in a direction indicated by an arrow Z in FIG. 3 (hereinafter referred to as a traveling direction Z) at a low speed of, for example, about 20 km/h.

The parking lot 500 may include arrays of parking sections 503 divided by dividing lines 501. The traveling road 502 on which vehicles are allowed to travel may be defined in a predetermined region between the arrays of the parking sections 503. In the parking sections 53, a plurality of other vehicles are randomly parked, as illustrated in FIG. 3.

The parking lot 500 may further include the parking lot monitoring system 200. The parking lot monitoring system 200 may be a small-scale administration system including, for example, at least one monitor camera and a small-scale administration apparatus that comprehensively administrates image data acquired by the monitor camera. The parking lot 500 may be administrated by the parking lot monitoring system 200.

The monitor camera in the parking lot monitoring system 200 may be disposed at a relatively high position on, for example, an illumination pole provided at a predetermined location within the parking lot 500. The monitor camera disposed at a relatively high position makes it possible to constantly capture a bird's-eye view image of the interior of the parking lot 500 to be monitored. On the basis of the image captured by the monitor camera, the parking lot monitoring system 200 may generate a mini map limited to the parking lot 500, for example.

In addition to centrally controlling the image data acquired by the monitor camera, the parking lot monitoring system 200 may send and receive information to/from the other vehicles within the parking lot 500 via wireless communication (e.g., road-to-vehicle communication).

The own vehicle M1 including the traveling control apparatus 10 according to the example embodiment may be brought into the condition illustrated in FIG. 3 as follows: The own vehicle M1 traveling on an ordinary road (not illustrated) under ordinary traveling control may enter the parking lot 500 illustrated in FIG. 3 beside the ordinary road, and may be brought in the condition illustrated in FIG. 3. After entering the parking lot 500, the own vehicle M1 may first travel on the traveling road 502 at low speed, and park in a desired empty parking section, if any.

Within the parking lot 500, there may be some pedestrians or other mobile objects moving on the traveling road 502 and between the vehicles parked in the respective parking sections 503. For example, in the exemplary condition illustrated in FIG. 3, a pedestrian H is moving in the space between other vehicles M2 and M3 in a direction indicated by an arrow X of FIG. 3.

In this case, the space between the other vehicle M2 and M3 is a blind spot outside the regions Af, Afl, and Afr recognized by the camera unit (e.g., the main camera 11a and the subsidiary camera 11b) or the radar devices 11fl and 11fr of the traveling control apparatus 10 in the own vehicle M1. Thus, the traveling control apparatus 10 of the own vehicle M1 traveling on the traveling road 502 is unable to recognize the pedestrian H moving in the space between the other vehicles M2 and M3 in the condition illustrated in FIG. 3.

As described above, the other vehicles are parked in the respective parking sections 503. Among the vehicles parked in the respective parking sections 503 illustrated in FIG. 3, the other vehicles M2, M3, M4, and M5 may be in a driven state, for example. The remaining other vehicles without reference numerals may be completely stopped.

Herein, the driven state of the vehicle may refer to the state in which at least the electric system is activated (e.g., the ACC or the power is turned on) or the state in which the electric system is activated and the engine is started (e.g., idling), for example.

For example, the driven state of the vehicle may be the state of the vehicle stopping on the traveling road 502 to wait for a parking section 503 (not illustrated), the state of the vehicle immediately after parking in a desired parking section 503, or the state of the vehicle being ready to start traveling to exit from the parking section 503.

When the other vehicles parked in the parking sections 503 are in the driven state as described above, the traveling control apparatuses 10A (not illustrated in FIG. 3) of the other vehicles may be also in a driven state (i.e., an ON state). Accordingly, each of the other vehicles M2, M3, M4, and M5 in the driven state may sequentially acquire surrounding environment information of the vehicle. The surrounding environment information may be sent to the own vehicle M1 and the parking lot monitoring system 200 via the inter-vehicle communication or the road-to-vehicle communication as appropriate. At the same time, each of the other vehicles M2, M3, M4, and M5 may be able to receive information from the own vehicle M1.

In the condition illustrated in FIG. 3, the other vehicle M2 may recognize the pedestrian H with its right-rear radar device 11rr (see a region Arr2 in FIG. 3), and the other vehicle M3 may recognize the pedestrian H with its left-rear radar device 11rl (see a region Arl3 in FIG. 3). Additionally, the other vehicle M5 may recognize the pedestrian H with its camera unit (e.g., the main camera 11a and the subsidiary camera 11b) (see a region Af4 in FIG. 3).

As described above, the other vehicles M2, M3, and M5 in the driven state may recognize the pedestrian H moving in the blind spot that the own vehicle M1 traveling on the traveling road 502 within the parking lot 500 is unable to recognize, in some cases. When recognizing the presence of the pedestrian H, the other vehicles M2, M3, and M5 may acquire information on the position of the pedestrian H and recognize the moving distance, the moving direction, the moving speed, and so forth of the pedestrian H by continuously recognizing the pedestrian H on at a predetermined cycle.

The own vehicle M1 including the traveling control apparatus 10 according to the example embodiment may preliminarily acquire the information on the pedestrian H present in the blind spot of the own vehicle M1 on the basis of the second surrounding environment information (the other vehicle information) received from the other vehicles M2, M3, and M5 via the inter-vehicle communication or the road-to-vehicle communication, separately from the first surrounding environment information acquired by the traveling control apparatus 10 (e.g., the camera unit or the radar devices) of the own vehicle M1.

On the basis of the other vehicle information, the own vehicle M1 may estimate the movement of the pedestrian H to predict an appearance of the pedestrian H in front of the own vehicle M1 in a predetermined time. Accordingly, the traveling control apparatus 10 of the own vehicle M1 makes it possible to sufficiently prepare in advance to deal with the pedestrian H even when the emergency braking control is executed upon the recognition of the pedestrian H based on the first surrounding environment information acquired by the camera unit or the radar devices of the own vehicle M1. Accordingly, it is possible to appropriately execute the traveling control that avoids contact between the own vehicle M1 and the pedestrian H present in the blind spot with a margin of time. The traveling control will be described in detail later.

In the condition illustrated in FIG. 3, the other vehicles M2, M3, M4, and M5 in the driven state are expected to start moving at any time. Thus, the second surrounding environment information (the other vehicle information) sent from these other vehicles in the drive state may include information on the states of the other vehicles, such as information on the position of the select lever operated by the driver to start the vehicle traveling. By receiving the other vehicle information in advance, the own vehicle M1 makes it possible to preliminarily recognize the other vehicles ready to start traveling, for example. Accordingly, it is possible to appropriately execute the traveling control that avoids contact between the own vehicle M and the other vehicle with a margin of time even when the other vehicle having been ready to start traveling suddenly enters the traveling road 502 without noticing the own vehicle M1. The details thereof will be described later.

Figure 4:
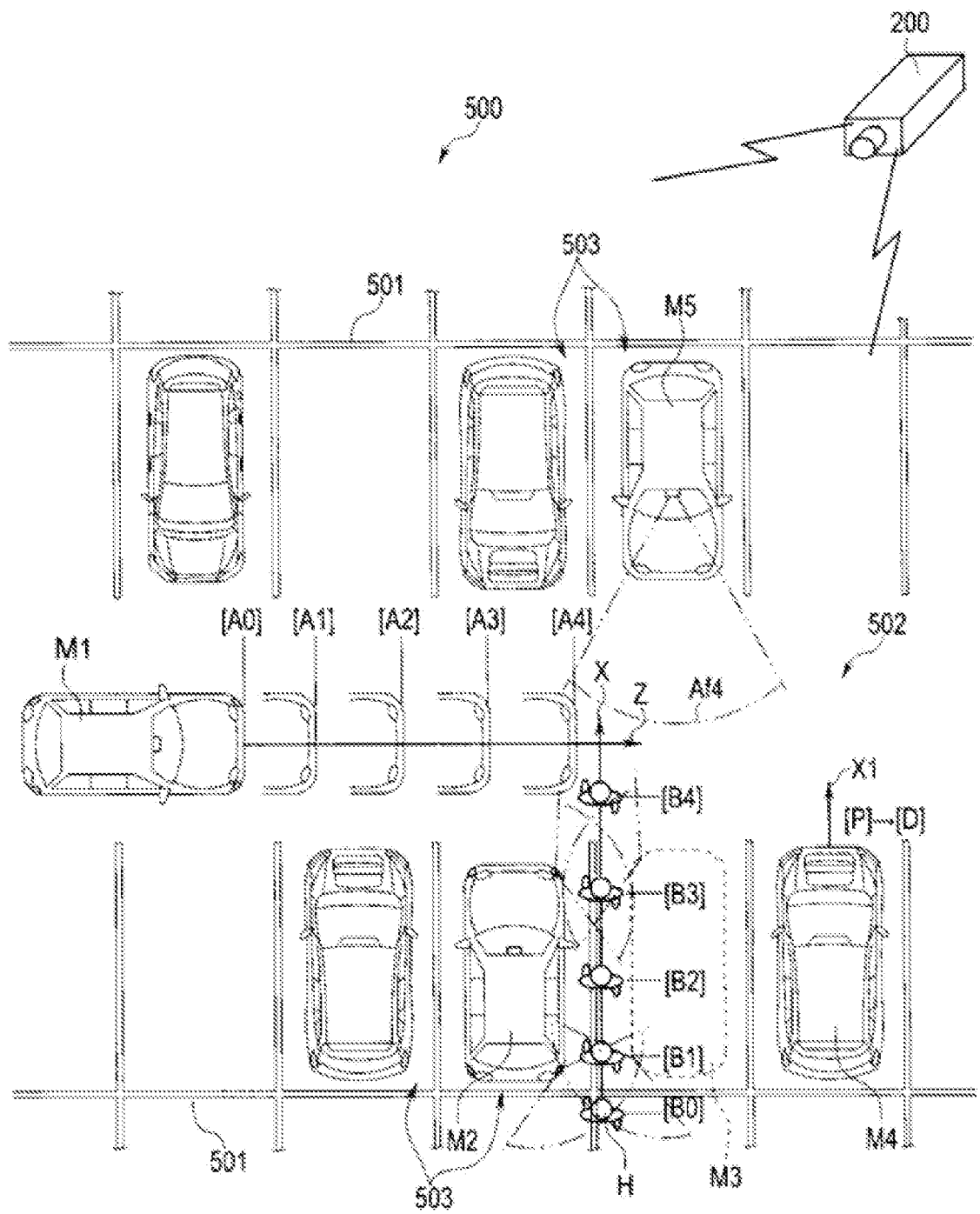
FIG. 4 is a conceptual diagram illustrating an exemplary operation of the vehicle including the traveling control apparatus according to one example embodiment of the technology in the condition illustrated in FIG. 3.

An exemplary operation of the own vehicle M including the traveling control apparatus 10 according to the example embodiment in the condition illustrated in FIG. 3 will now be simply described with reference to FIG. 4. FIG. 4 is a conceptual diagram illustrating the exemplary operation of the own vehicle M1, including the traveling control apparatus according to the example embodiment, observed while the traveling control apparatus 10 is traveling in the parking lot. As the condition illustrated in FIG. 4 is substantially the same as that in FIG. 3, some reference numerals are omitted so as not to complicate the drawing.

While the own vehicle M1 including the traveling control apparatus 10 according to the example embodiment is traveling on an ordinary road (not illustrated) under ordinary traveling control, the traveling control apparatus 10 may recognize the surrounding environment around the own vehicle M1 with the camera unit or the radar devices. The own vehicle M1 may then enter the parking lot 500 (illustrated in FIGS. 3 and 4) provided beside the ordinary road.

When the own vehicle M1 enters the parking lot 500, the traveling control apparatus 10 of the own vehicle M1 may transmit own vehicle information (the first surrounding environment information) to the other vehicles traveling around the own vehicle M1 via the inter-vehicle communication. In one embodiment, the own vehicle information may serve as "first vehicle information". The own vehicle information may include the information on the position of the own vehicle M1 and information indicating that the own vehicle M1 is traveling within the parking lot 500. In this case, the transmission range of the inter-vehicle communication may be within about a 300-meter radius around the own vehicle M1, for example. In this case, the transmission range may mainly cover a region in front of the own vehicle M1 in the traveling direction.

It may be determined whether the own vehicle M1 has entered the parking lot 500 on the basis of the information on the position of the own vehicle M1 acquired by the locator unit 12 and the surrounding environment information acquired by the camera unit or the radar devices, for example.

After the own vehicle M1 enters the parking lot 500, the own vehicle M1 may travel on the traveling road 502 within the parking lot 500. In such a condition, the own vehicle M1 is usually required to travel at a speed lower than a speed set when the own vehicle M1 travels on the ordinary road. For example, the own vehicle M1 may be required to travel at a speed of 20 km/h or lower. In the example illustrated in FIG. 4, the own vehicle M1 may travel in the traveling direction Z.

The own vehicle M1 may transmit the own vehicle information to the other vehicles via the inter-vehicle communication as described above. Optionally, the own vehicle M1 may further send the own vehicle information to the parking lot monitoring system 200 via the road-to-vehicle communication. In this case, the parking lot monitoring system 200 may comprehensively administrate the information on the interior of the parking lot 500 on the basis of the information received from the vehicles present within the parking lot 500 and the image data acquired by the monitor camera, for example. Thereafter, the own vehicle M1 may send information required by the vehicles present within the parking lot 500 to the vehicles. For example, the information on vehicles traveling on the traveling road 502 and pedestrians moving within the parking lot 500 may be retrieved from the bird's eye view image data on the parking lot 500 acquired by the monitor camera. The parking lot monitoring system 200 may send the information on the position, moving distance, moving direction, and moving speed of the pedestrian moving near the vehicle to the vehicles traveling on the traveling road 502.

The own vehicle information sent from the own vehicle M1 may be received by the other vehicles in the driven state within the parking lot 500 (e.g., the other vehicles M2, M3, M4, and M5 in the example illustrated in FIG. 4). The other vehicles having received the information from the own vehicle M1 may send their surrounding environment information and their vehicle information (i.e., the other vehicle information) to the own vehicle M, for example. In one embodiment, the other vehicle information may serve as "second vehicle information".

The other vehicle information sent from the other vehicles in the driven state within the parking lot 500 to the own vehicle M1 may include, for example, information on the pedestrians recognized by the other vehicles and the information on the states of the other vehicles (e.g., the information on the position of the select lever).

In this case, the information on the pedestrian may include, for example, the information on the position, moving distance, moving direction, and moving speed of the pedestrian H recognized by the other vehicles.

For example, in the example illustrated in FIG. 4, the other vehicles M2, M3, and M5 may recognize the presence of the pedestrian H at a position B0 illustrated in FIG. 4. In this case, the other vehicles M2, M3, and M5 may continuously recognize the pedestrian H.

After recognizing the pedestrian H at the position B0 of FIG. 4, the other vehicles M2, M3, and M5 may recognize the same pedestrian H at a position B1 after a predetermined time (e.g., after one second). The other vehicles M2, M3, and M5 may determine the moving direction of the pedestrian H and calculate the moving distance of the pedestrian H on the basis of the relative position between the pedestrian H present at the position B0 and the other vehicles M2, M3, and M5 including the respective recognition devices and the relative position between the pedestrian H present at the position B1 and the other vehicles M2, M3, and M5. Additionally, the other vehicles M2, M3, and M5 may calculate the moving speed of the pedestrian H on the basis of the calculated moving distance and an elapsed time from the position B0 to the position B1. As described above, the other vehicles M2, M3, and M5 may continuously acquire the information on the pedestrian H while the pedestrian H is moving. The other vehicles M2, M3, and M5 may send the acquired information to the own vehicle M1 at a predetermined cycle.

When the driver in the other vehicle stopping in the driven state (e.g., the other vehicle M4 illustrated in FIG. 4) performs a switching operation to switch the position of the select lever from the parking (P) position to the drive (D) position, for example, the vehicle state of the other vehicle M4 may change from a stopping state to a traveling ready state, and start traveling in a direction indicated by an arrow X1 (hereinafter referred to as a direction X1) in FIG. 4 toward the traveling road 502. In a case where the traveling direction Z of the own vehicle M1 intersects with the direction X1 in which the other vehicle M2 is expected to travel, there may be a possibility of contact between the own vehicle M1 and the other vehicle M4.

In such a case, the other vehicle information sent from the other vehicle M4 via the inter-vehicle communication may include the information indicating that the select lever of the other vehicle M4 has been switched from the P position to the D position, i.e., the information indicating that the other vehicle M4 has changed from the stopping state to the traveling ready state.

As described above, the own vehicle M1 may continue to travel at low speed on the traveling road 502 within the parking lot 500 while confirming the surrounding environment information of the own vehicle M1 with the camera unit or the radar devices in the own vehicle M1 and receiving the other vehicle information from the other vehicles in the driven state within the parking lot 500.

In this case, the own vehicle M1 may preliminarily recognize a mobile object that the camera unit and the radar devices of the own vehicle M1 are unable to detect on the basis of the other vehicle information received from the other vehicles, prior to recognition of the mobile object by the own vehicle M1 itself. For example, the mobile object may be the pedestrian H present in a blind spot of the own vehicle M1, or the other vehicle M4 being in the driven state ready to start traveling and present in the region in front of the own vehicle M1. Additionally, the own vehicle M1 may estimate the possibility of contact between the mobile object preliminarily recognized and the own vehicle M1 on the basis of the other vehicle information received from the other vehicles.

In other words, in a case where the pedestrian H present in the blind spot of the own vehicle M1 is preliminarily recognized on the basis of the other vehicle information and where the information on the pedestrian H (e.g., the information on the position, moving distance, moving direction, and moving speed of the pedestrian H) is acquired, the traveling control apparatus 10 of the own vehicle M1 may perform a contact estimation process on the basis of the acquired information on the pedestrian H and the own vehicle information on the traveling direction and traveling speed of the own vehicle M1. In the contact estimation process, the traveling control apparatus 10 may estimate the possibility of contact between the own vehicle M1 and the pedestrian H in a predetermined time.

For example, when the pedestrian H in the blind spot of the own vehicle M1 (e.g., the space between the other vehicles M2 and M3) moves from the position B0 in the direction indicated by the arrow X (hereinafter referred to as a moving direction X) as illustrated in FIG. 4, position B1, B2, B3, and B4 may be estimated at a predetermined time interval, as illustrated in FIG. 4.

When the pedestrian H is present at the position B0 in FIG. 4, the own vehicle M1 may be present at the position A0 in FIG. 4. When the own vehicle M1 moves from the position A0 in the traveling direction Z in FIG. 4, the own vehicle M1 may be present at a position A1, a position A2, a position A3, and a position A4 at the predetermined time interval.

In this example, the moving direction X of the pedestrian H may intersect with the traveling direction Z of the own vehicle M1. Additionally, the estimated positions B1, B2, B3, and B4 of the pedestrian H may correspond to the estimated positions A1, A2, A3, and A4 of the own vehicle M1, respectively.

In this case, when the own vehicle M1 reaches the position A4 in FIG. 4, the pedestrian H may reach the position B4. Thus, it may be estimated that the own vehicle M1 at the position A4 will come into contact with the pedestrian H at the position B4.

If the pedestrian H is moving in a direction not intersecting with the traveling direction Z of the own vehicle M1, it may be determined that there is no possibility of contact between the own vehicle M1 and the pedestrian H. For example, when the pedestrian H moves in a direction substantially parallel to the traveling direction Z of the own vehicle M1 or when the pedestrian H moves in a direction away from the traveling road 502 of the own vehicle M1, the moving direction of the pedestrian H does not intersect with the traveling direction Z of the own vehicle M1.

Figure 5:
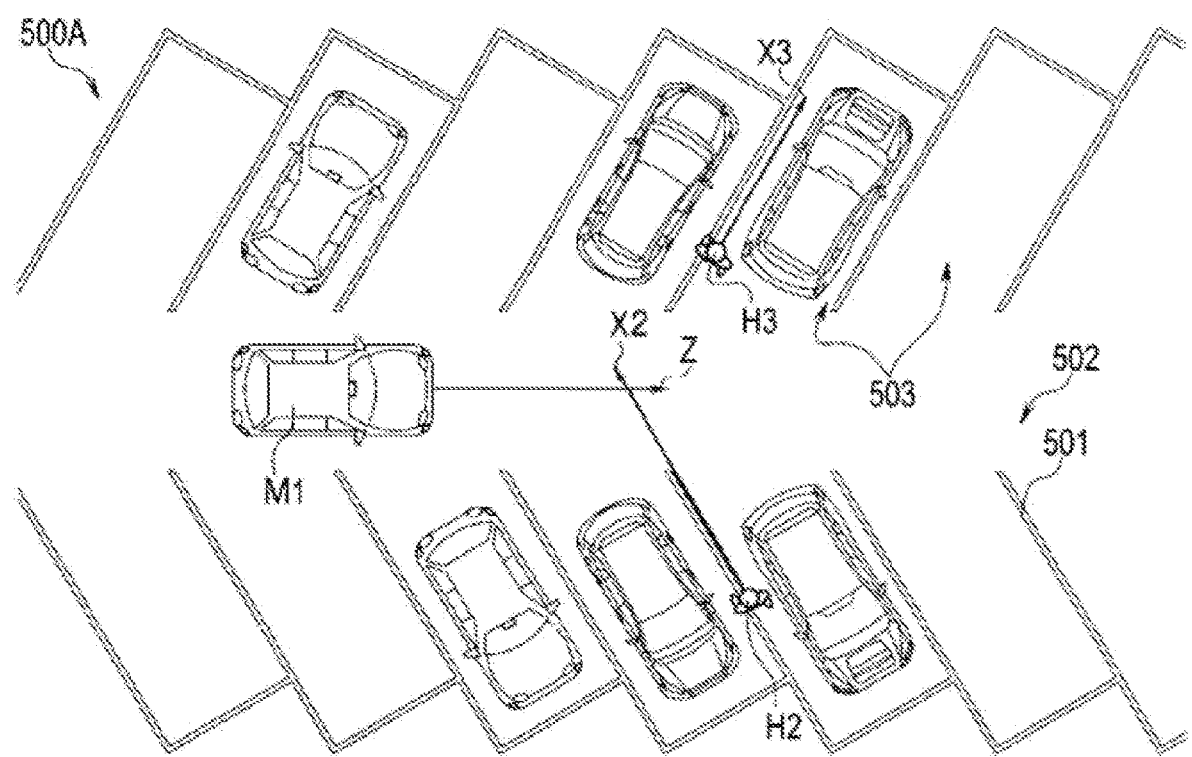
FIG. 5 is a conceptual diagram illustrating a parking lot different from the parking lot illustrated in FIG. 3.

FIG. 5 illustrates a parking lot 500A different from the parking lot 500 illustrated in FIGS. 3 and 4, for example. The parking lot 500A illustrated in FIG. 5 may have the parking sections 503 each defining a predetermined angle with respect to the extending direction of the traveling road 502 (i.e., the traveling direction Z of the vehicle traveling on the traveling road 502). The parking lot 500A having such a configuration is often seen in a rest area of an automobile highway, for example.

In the parking lot 500A having such a configuration, a pedestrian H2 illustrated in FIG. 5 may move between the other vehicles parked in the respective parking sections 503 in a moving direction X2 defining a predetermined angle with respect to the traveling direction Z of the own vehicle M1 traveling on the traveling road 502. In this case, the moving direction X2 of the pedestrian H2 may intersect with the traveling direction Z of the own vehicle M1. Thus, also in this case, it may be determined that there is a possibility of contact between the pedestrian H2 and the own vehicle M1.

In contrast, a pedestrian H3 illustrated in FIG. 5 may move between the vehicles parked in the respective parking sections 503 in a moving direction X3 away from the traveling road 502 (i.e., away from the own vehicle M1). In this case, it may be determined that there is no possibility of contact between the pedestrian H3 and the own vehicle M1.

Figure 6:
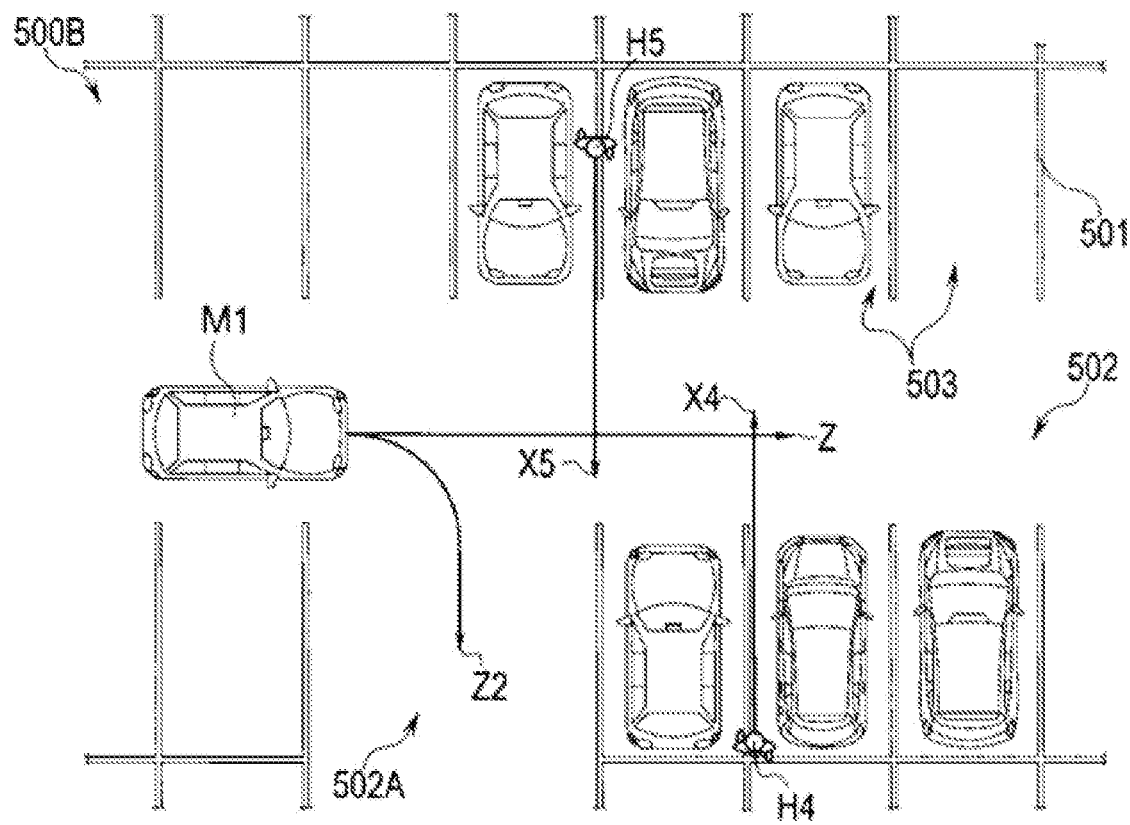
FIG. 6 is a conceptual diagram illustrating an exemplary operation of the vehicle observed when the vehicle travels on a branching traveling road in the parking lot substantially the same as the parking lot illustrated in FIG. 3.

FIG. 6 illustrates a parking lot 500B of substantially the same as the parking lot 500 illustrated in FIGS. 3 and 4. However, unlike the parking lot 500 illustrated in FIGS. 3 and 4, the parking lot 500B illustrated in FIG. 6 may have a traveling road 502A branching from the traveling road 502 at substantially a right angle.

The own vehicle M1 traveling on the traveling road 502 within the parking lot 500B in the traveling direction Z may possibly turn right to enter the traveling road 502A in some cases. In this case, the traveling direction of the own vehicle M1 may change from the traveling direction Z to a direction indicated by an arrow Z2 (hereinafter a traveling direction Z2).

In this example illustrated in FIG. 6, pedestrians H4 and H5 may be present at respective blind spots in a region in front of the own vehicle M1. The pedestrian H4 may move in a direction indicated by an arrow X4 (hereinafter referred to as a moving direction X4), and the pedestrian H5 may move in a direction indicated by an arrow X5 (hereinafter referred to as a moving direction X5). In this example, the moving direction X4 of the pedestrian H4 and the moving direction X5 of the pedestrian H5 may be each directed in a direction substantially parallel to the traveling road 502A.

An exemplary operation of the traveling control apparatus 10 of the own vehicle M1 in this condition will now be simply described.

First, while the own vehicle M1 is traveling on the traveling road 502 in the traveling direction Z, the own vehicle M1 may recognize the pedestrians H4 and H5 present in the respective blind spots of the own vehicle M1 on the basis of the other vehicle information acquired through the inter-vehicle communication, and acquire information on the pedestrians H4 and H5 (e.g., information on the positions, moving directions, and moving speeds of the pedestrians H4 and H5). Thereafter, the traveling control apparatus 10 of the own vehicle M1 may estimate a possibility of contact between the own vehicle M1 and the pedestrian H4 or H5.

In this case, it may be determined that there is the possibility of contact between the own vehicle M1 and the pedestrian H4 or H5 as long as the own vehicle M1 travels in the traveling direction Z. However, when the own vehicle M1 traveling on the traveling road 502 turns right to enter the traveling road 502A, the traveling direction of the own vehicle M1 may change from the traveling direction Z to the traveling direction Z2. In this case, the moving directions X4 and X5 of the pedestrians H4 and H5 present in the respective blind spots of the own vehicle M1 may become substantially parallel to the traveling direction Z2 of the own vehicle M1. Thus, in such a case, it may be determined that there is no possibility of contact between the own vehicle M1 and the pedestrian H4 or H5.

Even if it has been determined that there is the possibility of contact between the own vehicle M1 and the pedestrian H4 or H5 once, the determination may be canceled when the own vehicle M1 is determined to have no possibility of contact with the pedestrian H4 or H5 when the own vehicle M1 changes its traveling direction before encountering the pedestrian H4 or H5 recognized in advance.

In this case, the information on the traveling direction of the own vehicle M1 may be acquired by comprehensively considering the amount of steering operation, the first surrounding environment information acquired by the camera unit and the radar devices, and the information acquired through the inter-vehicle communication between the own vehicle and other vehicles, for example.

If it is determined that there is the possibility of contact between the own vehicle M1 and the pedestrian H as described above, the traveling control apparatus 10 of the own vehicle M1 may perform predetermined deceleration control that decelerates the own vehicle M1 to a speed lower than an ordinary low speed set within the parking lot 500, and change a parameter for the AEB control.

For example, the traveling control apparatus 10 may change an operation starting threshold, which serves as the AEB control parameter, to a lower value. Additionally, the traveling control apparatus 10 may also perform driving control of the throttle actuator 27 via the engine control unit 23 to control the throttle opening position relative to the stepping quantity of the accelerator pedal.

Such preliminary deceleration control makes it possible to delay the arrival time of the own vehicle M1 at an estimated site of contact with the pedestrian H. This reduces the possibility of the contact between the own vehicle M1 and the pedestrian H.

Additionally, such a preliminary decrease in the operation starting threshold, which serves as the AEB control parameter, makes it possible to start the AEB control at a much earlier timing after the recognition of the pedestrian H by the camera unit or the like of the own vehicle M1. Accordingly, even when the pedestrian H suddenly appears immediately in front of the own vehicle M1 from the blind spot of the own vehicle M1, it is possible to start operating the AEB control at an earlier timing than in the ordinary traveling control. This leads to the control with a margin of time.

Likewise, also when preliminarily recognizing the presence of the other vehicle in the driven state and ready to start traveling in front of the own vehicle M1, the traveling control apparatus 10 of the own vehicle M1 may preliminarily perform the deceleration control to cause the own vehicle M1 to travel at low speed, and change the AEB control parameter (e.g., lower the operation starting threshold).

Accordingly, even if the other vehicle M4 having been parked suddenly enters a region of the traveling road 502 in front of the own vehicle M1 without noticing the own vehicle M1, it is possible to start operating the AEB control at an earlier timing than in the ordinary traveling control. This leads to the control with a margin of time.

However, when the own vehicle M1 performs the deceleration control after preliminarily recognizing the presence of the pedestrian H moving in the blind spot or the other vehicle M4 ready to start traveling mainly on the basis of the second surrounding environment information, and continuously travels at low speed after lowering the operation starting threshold for the AEB control as described above, the camera unit or the like of the own vehicle M1 may fail to recognize the pedestrian H or the other vehicle M4 suddenly appearing immediately in front of the own vehicle M1 contrary to expectations in some cases. Even in these cases, the traveling control apparatus 10 may continuously perform the deceleration control to cause the own vehicle M1 to travel at low speed. Thereafter, the traveling control apparatus 10 may repeat the same control while the own vehicle M1 is traveling within the parking lot 500.

Figure 7:
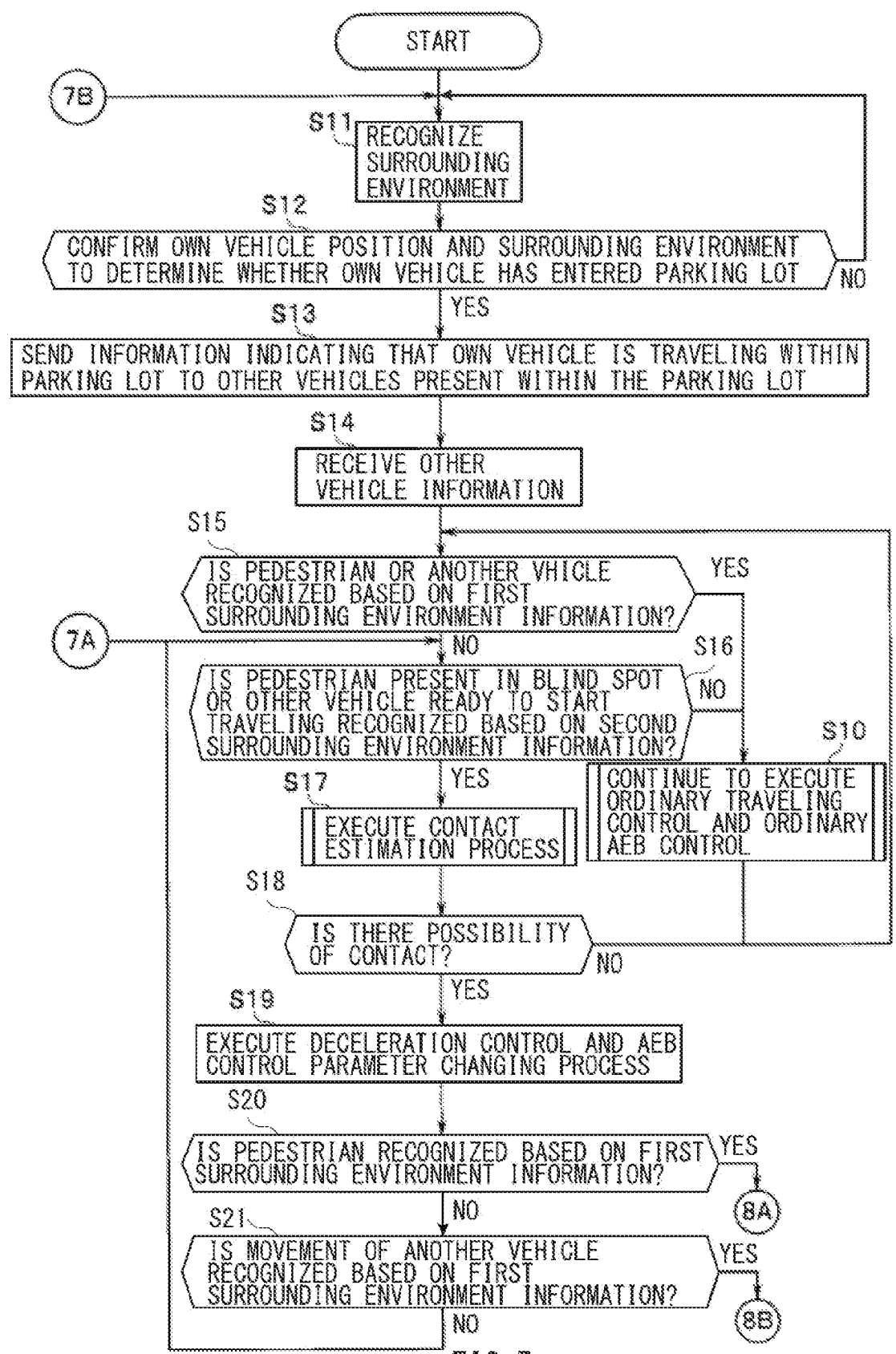
FIG. 7 is a flowchart illustrating a first half part of an exemplary operation of the traveling control apparatus according to one example embodiment of the technology.
Figure 8:
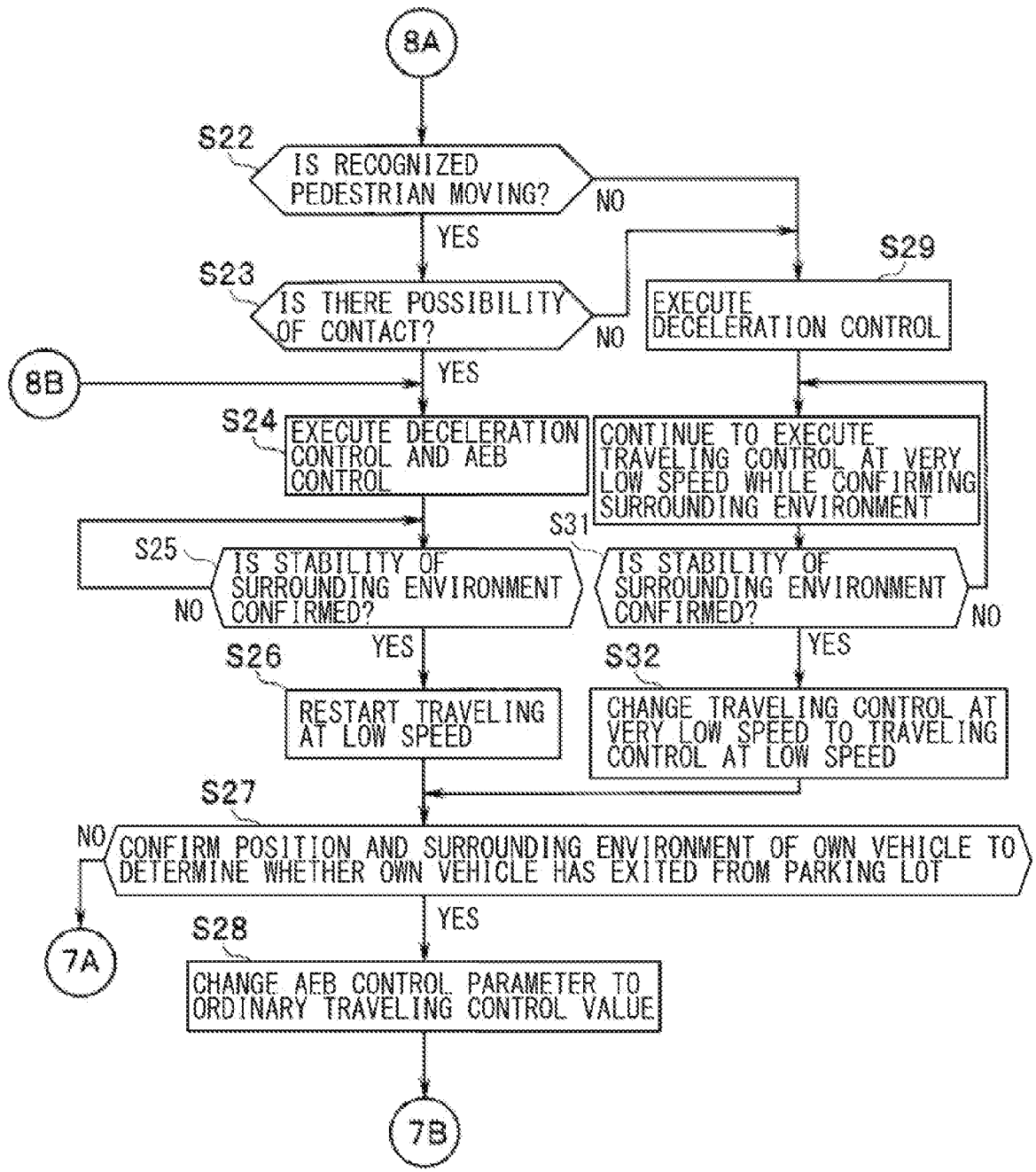
FIG. 8 is a flowchart illustrating a latter half part of the exemplary operation of the traveling control apparatus according to one example embodiment of the technology.

The exemplary operation of the traveling control apparatus 10 according to the example embodiment described above will now be described with reference to the flowcharts of FIGS. 7 and 8. FIGS. 7 and 8 are flowcharts illustrating the exemplary operation of the traveling control apparatus according to the example embodiment.

First, the flowchart of FIG. 7 may start when the own vehicle M1 including the traveling control apparatus 10 according to the example embodiment is driven and becomes ready to start traveling.

In Step S11 of FIG. 7, the traveling control apparatus 10 may travel while recognizing the surrounding environment around the own vehicle M1 on the basis of the first environment information acquired by the camera unit or the radar devices, for example.

In Step S12, the traveling control apparatus 10 may confirm the position of the own vehicle M1 or the surrounding environment around the own vehicle M1, and determine whether the own vehicle M1 has entered the parking lot 500 on the basis of the confirmation. If the traveling control apparatus 10 determines that the own vehicle M1 has entered the parking lot 500 (Step S12: YES), the procedure may proceed to Step S13. In contrast, if the traveling control apparatus 10 does not determine that the own vehicle M1 has entered the parking lot 500 (Step S12: NO), the traveling control apparatus 10 may determine that the own vehicle M1 is traveling on a non-illustrated ordinary road under ordinary traveling control, and the procedure may return to Step S11.

In Step S13, the traveling control apparatus 10 may send the own vehicle information indicating that the own vehicle M1 is traveling in the parking lot 500 to the other vehicles present within the parking lot 500 via the inter-vehicle communication. Additionally, the own vehicle M1 may send the own vehicle information to the parking lot monitoring system 200 in the parking lot 500 via the road-to-vehicle communication. Thereafter, the procedure may proceed to Step S14.

The own vehicle information sent from the own vehicle M1 may be received by the parking lot monitoring system 200 or the other vehicles in the driven state among the other vehicles present within the parking lot 500. In this case, the other vehicles having received the own vehicle information may send their surrounding environment information (i.e., the other vehicle information) acquired and owned by themselves to the own vehicle M1 via the inter-vehicle communication. Additionally, the other vehicle information may be sent to the parking lot monitoring system 200.

In Step S14, the traveling control apparatus 10 may receive the other vehicle information from the other vehicles in the driven state within the parking lot 500 via the inter-vehicle communication. Thereafter, the procedure may proceed to Step S15.

The other vehicles in the driven state may continuously send the other vehicle information owned by themselves at a predetermined time interval. The own vehicle M1 may receive the other vehicle information every time the other vehicle information is sent. The other vehicle information received by the own vehicle M1 may be the information on the other vehicles present within about a 300-meter radius around the own vehicle M1 (e.g., mainly a region in front of the own vehicle M1) out of the other vehicles present within the parking lot 500, for example.

In Step S15, the traveling control apparatus 10 may determine whether a pedestrian or another vehicle is recognized in the front region of the own vehicle M1 on the basis of the first surrounding environment information acquired by the camera unit or the radar devices. If the presence of the pedestrian or the movement of the other vehicle is recognized (Step S15: YES), the procedure may proceed to Step S10. In contrast, if the presence of the pedestrian or the movement of the other vehicle is not recognized (Step S15: NO), the procedure may proceed to Step S16.

In Step S16, the traveling control apparatus 10 may determine whether a pedestrian or another vehicle ready to start traveling is recognized in a blind spot of the own vehicle M1 on the basis of the second surrounding environment information (e.g., the other vehicle information received from the other vehicles or the parking lot information received from the parking lot monitoring system 200). If the pedestrian or the other vehicle ready to start traveling is recognized in the blind spot of the own vehicle M1 (Step S16: YES), the procedure may proceed to Step S17. In contrast, if the pedestrian or the other vehicle ready to start traveling is not recognized in the blind spot of the own vehicle M1 (Step S16: NO), the procedure may proceed to Step S10.

As described above, if the pedestrian or the other vehicle is recognized on the basis of the first surrounding environment information in Step S15 (Step S15: YES) or if the pedestrian or the other vehicle ready to start traveling is not recognized in the blind spot on the basis of the second surrounding environment information in Step S16 (Step S16: NO), the procedure may proceed to Step S10. In Step S10, the traveling control apparatus 10 may execute the ordinary AEB control as required while continuously performing the ordinary traveling control that causes the own vehicle M1 to travel at low speed. Thereafter, the procedure may return to Step S15.

In Step S17, the traveling control apparatus 10 may execute contact estimation process to estimate whether the own vehicle M1 will come into contact with the pedestrian H recognized in the blind spot of the own vehicle M1 if the own vehicle M1 keeps traveling in the current state.

Thereafter, in Step S18, the traveling control apparatus 10 may determine whether there is a possibility of contact between the own vehicle M1 and the pedestrian H on the basis of the result of the contact estimation process executed in Step S17. If it is determined that there is the possibility of contact (Step S18: YES), the procedure may proceed to Step S19. In contrast, if it is determined that there is no possibility of contact (Step S18: NO), the procedure may return to Step S15.

In Step S19, the traveling control apparatus 10 may perform a predetermined deceleration control process and an AEB control parameter changing process. In the AEB control parameter changing process, the traveling control apparatus 10 may lower the operation starting threshold, which is used to start the AEB control, for example. By lowering or decreasing the operation starting threshold for the AEB control, it is possible to start the AEB control at an earlier timing.

For example, if the loop process in the flowchart has been already repeated twice or more, the deceleration control and the AEB control parameter changing process may have been already completed before Step S19. In such a case where the deceleration control has been already sufficiently performed and where the AEB control parameter has been already set (e.g., the operation starting threshold has been already lowered), the values having been set may be maintained in Step S19. Thereafter, the procedure may proceed to Step S20.

If it is determined in Step S18 that there is the possibility of contact (Step S18: YES), the deceleration control may be performed in Step S19, as described above. Prior to the deceleration control, the traveling control apparatus 10 of the own vehicle M1 may perform a warning process to notify the driver of the own vehicle M1 of the information indicating the presence of the pedestrian H in a blind spot in front of the own vehicle M1. In the warning process, a warning sound or voice may be generated through a sounding device such as a speaker, or a visual warning notification may be displayed on a display, for example.

In Step S20, the traveling control apparatus 10 may determine whether a pedestrian is recognized in a region in front of the own vehicle M1 on the basis of the first surrounding environment information. If the pedestrian is recognized (Step S20: YES), the procedure may proceed to Step S22 of FIG. 8 (see the reference numeral 8A in a circle of FIGS. 7 and 8). In contrast, if no pedestrian is recognized (Step S20: NO), the procedure may proceed to Step S21.

In Step S21, the traveling control apparatus 10 may determine whether another vehicle moving in a region in front of the own vehicle M1 is recognized on the basis of the first surrounding environment information. If the other vehicle moving in the region is recognized (Step S21: YES), the procedure may proceed to Step S24 of FIG. 8 (see the reference numeral 8B surrounding by a circle in FIGS. 7 and 8). If the other vehicle moving in the region is not recognized (Step S21: NO), the procedure may return to Step S16.

In Step S22 of FIG. 8, the traveling control apparatus 10 may determine whether the pedestrian H recognized in Step S20 described above is moving. If it is determined that the pedestrian H is moving (Step S22: YES), the procedure may proceed to Step S23. In contrast, if it is not determined that the pedestrian H is moving (Step S22: NO), the procedure may proceed to Step S29.

The determination as to whether the pedestrian H is moving may be performed by detecting a positional relationship of an object of interest within frames on the basis of a plurality of pieces of detection data sequentially acquired by the camera unit or the radar devices.

For example, the pedestrian H may be determined not to be moving when the pedestrian H is stopping to chat with people, operating an automatic vending machine or a parking fee adjustment machine, loading a baggage on a vehicle, or waiting for a vehicle to pass.

In Step S23, the traveling control apparatus 10 may determine whether there is a possibility of contact between the own vehicle M1 and the pedestrian H. If there is the possibility of contact between the own vehicle M1 and the pedestrian H (Step S23: YES), the procedure may proceed to Step S24. In contrast, if there is no possibility of contact between the own vehicle M1 and the pedestrian H (Step S23: NO), the procedure may proceed to Step S29.

It may be determined that there is no possibility of contact between the own vehicle M1 and the pedestrian H when the moving direction of the pedestrian H is substantially parallel to the traveling direction Z of the own vehicle M1, or when the moving direction of the pedestrian H is directed away from the own vehicle M1, for example. The moving direction of the pedestrian H may be determined on the basis of the image data acquired by the camera unit.

In Step S24, the traveling control apparatus 10 may execute the deceleration control and the AEB control as appropriate to deal with the moving pedestrian having been recognized. This achieves the traveling control of the own vehicle M1 to avoid contact with the pedestrian having been recognized on the basis of the first surrounding environment information. For example, the deceleration control delays the timing when the own vehicle M1 comes into contact with the pedestrian, and the AEB control stops the own vehicle M1 when it is determined that there is the possibility of contact between the own vehicle M1 and the pedestrian. Accordingly, it is possible for the own vehicle M1 to avoid contact with the pedestrian. Thereafter, the procedure may proceed to Step S25.

In Step S25, the traveling control apparatus 10 may confirm the stability of the surrounding environment around the own vehicle M1 before restarting to travel. If the stability of the surrounding environment is confirmed, (Step S25: YES), the procedure may proceed to Step S26. In contrast, if the stability of the surrounding environment is not confirmed (Step S26: NO), the traveling control apparatus 10 may wait until the stability of the surrounding environment is confirmed.

For example, when the traveling control is executed by performing the control processing in Step S24, the own vehicle M1 may stop traveling. Thereafter, the own vehicle M1 may keep stopping and wait until the pedestrian having been recognized as the target object of the traveling control for avoiding contact leaves from a region near the own vehicle M1 and disappears from the recognition area of the own vehicle M1.

When the stability of the surrounding environment is confirmed in Step S25 described above (Step S25: YES), the traveling control apparatus 10 of the own vehicle M1 may cancel the braking control to cause the own vehicle M1 to restart traveling at low speed in Step S26. After restarting the own vehicle M1, the traveling control apparatus 10 of the own vehicle M1 may maintain the operation starting threshold set in Step S19 (see FIG. 5) described above as the AEB control parameter. Alternatively, the traveling control apparatus 10 of the own vehicle M1 may slightly relax the AEB control parameter (i.e., slightly raise the operation starting threshold). Thereafter, the procedure may proceed to Step S27.

Alternatively, the traveling control apparatus 10 may cancel the braking control when the driver pushes the accelerator pedal to cause the own vehicle M1 to restart traveling after recognizing that the stability of the surrounding environment has been confirmed in Step S25. In contrast, if the traveling control apparatus 10 does not determine that the stability of the surrounding environment has been confirmed on the basis of the first surrounding environment information, the braking control may be maintained regardless of an accelerator pedal operation performed by the driver. Desirably, the braking control may be canceled only after the stability of the surrounding environment is recognized by the traveling control apparatus 10.

Thereafter, in Step S27, the traveling control apparatus 10 may confirm the position and the surrounding environment of the own vehicle M1, and determine whether the own vehicle M1 has exited from the parking lot 500 on the basis of the result of the confirmation. If it is determined that the own vehicle M1 has exited from the parking lot 500 (Step S27: YES), the procedure may proceed to Step S28. In contrast, if it is not determined that the own vehicle M1 has exited from the parking lot 500 (Step S27: NO), the own vehicle M1 may be determined to keep traveling at low speed on the traveling road 502 within the parking lot 500. The procedure may thus return to Step S16 of FIG. 5 (see the reference number 7A in a circle of FIGS. 7 and 8).

In Step S28, the traveling control apparatus 10 may return the AEB control parameter to the value set for the ordinary traveling control. Thereafter, the procedure may return to Step S11 of FIG. 5 (see the reference number 7B in a circle of FIGS. 7 and 8) to keep performing the ordinary traveling control.

If it is not determined in Step S22 that the pedestrian recognized in Step S20 is moving (Step S22: NO) or if it is determined in Step S23 that there is no possibility of contact between the own vehicle M1 and the pedestrian (Step S23: NO), the procedure may proceed to Step S29, as described above. In Step S29, the traveling control apparatus 10 may execute the deceleration control and the traveling control to cause the own vehicle M1 to travel at very low speed. Thereafter, the procedure may proceed to Step S30.

In Step S30, the traveling control apparatus 10 may keep executing the traveling control to cause the own vehicle M1 to travel at very low speed while confirming the surrounding environment including the pedestrian serving as a target object. The pedestrian serving as the target object may be, for example, a pedestrian recognized in front of the own vehicle M1 and determined not to be moving, or a pedestrian having no possibility of contact with the own vehicle M1 (e.g., a pedestrian moving substantially in parallel to the traveling direction of the own vehicle M1 or a pedestrian moving away from the own vehicle M1).

In Step S31, the traveling control apparatus 10 may determine whether the stability of the surrounding environment is confirmed. In this case, the stability of the surrounding environment is confirmed when the pedestrian serving as the target object disappears from the recognition area of the own vehicle M1, for example. If the stability of the surrounding environment is confirmed (Step S31: YES), the procedure may proceed to Step S32. In contrast, if the stability of the surrounding environment is not confirmed (Step S31: NO), the process may return to Step S30.

In Step S32, the traveling control apparatus 10 may switch the traveling control that causes the own vehicle M1 to travel at very low speed to the traveling control that causes the own vehicle M1 to travel at low speed. Thereafter, the procedure may proceed to Step S27.

According to the example embodiment of the technology described above, while the own vehicle M1 is traveling at low speed within a predetermined region of the parking lot 500 beside an ordinary road, the traveling control apparatus 10 of the own vehicle M1 sends the own vehicle information (i.e., the first surrounding environment information) including the information on the position of the own vehicle M1 and the information indicating that the own vehicle M1 is traveling within the parking lot 500 to the other vehicles traveling around the own vehicle M1 via the inter-vehicle communication.

The other vehicles parked in the driven state within the parking lot 500 send their other vehicle information (i.e., the second surrounding environment information including the information on the positions, the surrounding environments, and the states of the other vehicles) owned by themselves via the inter-vehicle communication. The traveling control apparatus 10 of the own vehicle M1 receives the other vehicle information.

Accordingly, the traveling control apparatus 10 makes it possible to preliminarily recognize a pedestrian present in a blind spot of the own vehicle M1 or the state (e.g., the traveling ready state) of the other vehicle parked in a region in front of the own vehicle M1 on the basis of the second surrounding environment information received from the other vehicles.

When preliminarily recognizing the presence of the pedestrian moving in the blind spot of the own vehicle and the presence of the other vehicle in the traveling ready state as described above, the traveling control apparatus 10 of the own vehicle M1 executes the deceleration control and lowers the operation starting threshold, which serves as the AEB control parameter.

Accordingly, even if the traveling control apparatus 10 of the own vehicle M1 executes the emergency braking control at the timing when the first surrounding environment recognition unit 11d recognizes a pedestrian suddenly appearing from a blind spot or another vehicle suddenly entering a region in front of the traveling road on which the own vehicle is traveling, the traveling control apparatus 10 of the own vehicle M1 makes it possible to sufficiently deal with these moving objects and readily avoid contact with the moving objects.

In the foregoing example embodiments, the traveling control apparatus 10 may execute the traveling control including the emergency braking control on the basis of only the first surrounding environment information acquired by the own vehicle and the second surrounding environment information acquired through the inter-vehicle communication between the own vehicle and the other vehicles.

For example, in an in-door parking lot or a basement parking lot, it may be difficult to acquire the surrounding environment information on the basis of the image data acquired by the camera unit due to the darkness of the surrounding environment, or it may be difficult to acquire the GNSS information due to the presence of walls or floors that block radio waves.

Even in such a condition, the traveling control apparatus 10 according to the foregoing example embodiment makes it possible to acquire the surrounding environment information of the other vehicles and the other vehicle information through the inter-vehicle communication between the own vehicle M1 and the other vehicles within a limited region, and recognize the information on the surrounding environment including blind spots of the own vehicle. This allows the own vehicle M1 to readily avoid danger while traveling, achieving stable traveling control. Furthermore, the traveling control apparatus 10 is implemented at low costs without using a large server apparatus or a large apparatus in cooperation with the large server apparatus.

In the foregoing example embodiments of the technology, the own vehicle M1 may receive the other vehicle information from the other vehicles in the driven state out of the other vehicles present within the parking lot. However, this example is not restrictive. For example, in a case where the other vehicles are completely stopped but where minimum necessary components for recognizing the surrounding environment, such as autonomous sensor devices or transmitters, among the various component units of the other vehicles, are always kept in an operational state, the traveling control apparatus 10 may receive the other vehicle information also from these other vehicles. In such a configuration, the own vehicle M1 traveling within the parking lot makes it possible to receive much more pieces of the other vehicle information. Accordingly, it is possible to more readily recognize a pedestrian present in a blind spot of the own vehicle M1, for example.

In another example embodiment, the traveling control apparatus 10 may receive the second surrounding environment information only via the inter-vehicle communication between the own vehicle and the other vehicles without using the small-scale administration system or the parking lot monitoring system 200.

In still another example embodiment in which the small-scale administration system or the parking lot monitoring system 200 is used, the own vehicle and the other vehicles may communicate with the parking lot monitoring system 200 to receive various pieces of information from the parking lot monitoring system 200 for use. In this case, the own vehicle M1 makes it possible to recognize the surrounding environment more readily, securing more stable traveling control within the parking lot 500.

One or more of the first surrounding environment recognition unit 11d, the vehicle-side transceiver 18, the second surrounding environment recognition unit 13c, and the traveling control unit 22 in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the first surrounding environment recognition unit 11d, the vehicle-side transceiver 18, the second surrounding environment recognition unit 13c, and the traveling control unit 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the first surrounding environment recognition unit 11d, the vehicle-side transceiver 18, the second surrounding environment recognition unit 13c, and the traveling control unit 22 illustrated in FIG. 1.

The technology should not be limited to the foregoing example embodiments, and various modifications and application examples may be made without departing from the scope of the gist of the technology. Further, the foregoing example embodiments each include various stages of the technology, and various technologies may be extracted by appropriately combining the features of the technology disclosed herein. For example, in a case where the above-described concerns may be addressed and the above-described effects may be obtained even if some features are deleted from all the features disclosed herein, the remaining features may be extracted as a technology. Further, features of different example embodiments may be appropriately combined. The technology should not be limited by any particular example embodiment other than as limited by the appended claims.

According to the example embodiments of the technology, it is possible to readily avoid contact between a vehicle and a pedestrian or another vehicle even while the vehicle is traveling within a parking lot provided beside a road, for example.

The invention claimed is:

1. A vehicle traveling control apparatus comprising:
a first recognition unit configured to recognize, on a basis of first surrounding environment information acquired by an autonomous sensor device, a surrounding environment around a first vehicle to which the vehicle traveling control apparatus is to be applied, the surrounding environment around the first vehicle including a mobile object present around the first vehicle;
a transceiver configured to perform wireless communication with an external system outside the first vehicle to send the first surrounding environment information to the external system and receive second surrounding environment information from the external system;
a second recognition unit configured to recognize the surrounding environment around the first vehicle on a basis of the second surrounding environment information; and
a traveling control unit configured to control traveling of the first vehicle and including an emergency braking control unit configured to perform emergency braking control to stop the first vehicle in a case where there is a possibility of contact between the first vehicle and the mobile object recognized by the first recognition unit, wherein,
while the first vehicle is traveling at low speed,
the transceiver is configured to send the first surrounding environment information regarding the first vehicle to a second vehicle parked in front of the first vehicle in a traveling direction of the first vehicle and receive the second surrounding environment information from the second vehicle,
the second recognition unit is configured to recognize, on the basis of the second surrounding environment information, that the mobile object is present in a blind spot of the first vehicle in front of the first vehicle in the traveling direction of the first vehicle, or that the second vehicle which is parked is in a transition state from a stopping state to a traveling ready state, and
the traveling control unit is configured to execute deceleration control and change an operation starting threshold to a threshold lower than an ordinary value in a case where there is the possibility of contact between the first vehicle and the mobile object or the second vehicle, the operation starting threshold being a control parameter of the emergency braking control.

2. The vehicle traveling control apparatus according to claim 1, wherein
the first surrounding environment information comprises first vehicle information including at least information on a position of the first vehicle and information indicating that the first vehicle is traveling at low speed within a predetermined region, and
the second surrounding environment information comprises second vehicle information including information on a position of the second vehicle, information on a relative position between the second vehicle and a pedestrian recognized around the second vehicle as the mobile object, and information on a moving direction of the pedestrian and a moving speed of the pedestrian.

3. The vehicle traveling control apparatus according to claim 1, wherein
the transceiver is further configured to
send the first surrounding environment information owned by the first vehicle to an administration system and receive the second surrounding environment information including information on an environment within a predetermined region from the administration system via the wireless communication, the administration system being configured to administrate the predetermined region in which the first vehicle and the second vehicle are present.

4. A vehicle traveling control apparatus comprising
circuitry configured to
acquire first surrounding environment information,
recognize, on a basis of the first surrounding environment information, a surrounding environment around a first vehicle to which the vehicle traveling control apparatus is to be applied, the surrounding environment around the first vehicle including a mobile object present around the first vehicle,
perform wireless communication with an external system outside the first vehicle to send the first surrounding environment information to the external system and receive second surrounding environment information from the external system via wireless communication,
recognize the surrounding environment around the first vehicle on a basis of the second surrounding environment information, and
perform, while controlling traveling of the first vehicle, emergency braking control to stop the first vehicle in a case where there is a possibility of contact between the first vehicle and the mobile object recognized, wherein,
while the first vehicle is traveling at low speed,
the circuitry is configured to
send the first surrounding environment information regarding the first vehicle to a second vehicle parked in front of the first vehicle in a traveling direction of the first vehicle,
receive the second surrounding environment information from the second vehicle,
recognize, on the basis of the second surrounding environment information, that the mobile object is present in a blind spot of the first vehicle in front of the first vehicle in the traveling direction of the first vehicle, or that the second vehicle which is parked is in a transition state from a stopping state to a traveling ready state, and
execute deceleration control and change an operation starting threshold to a threshold lower than an ordinary value in a case where there is the possibility of contact between the first vehicle and the mobile object or the second vehicle, the operation starting threshold being a control parameter of the emergency braking control.

* * * * *